(12) United States Patent
Ito et al.

(10) Patent No.: US 8,518,490 B2
(45) Date of Patent: Aug. 27, 2013

(54) POROUS MATERIAL PRODUCTION METHOD

(75) Inventors: Koju Ito, Kanagawa (JP); Tsukasa Ishihara, Kanagawa (JP); Hidekazu Yamazaki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 633 days.

(21) Appl. No.: 12/749,921

(22) Filed: Mar. 30, 2010

(65) Prior Publication Data
US 2010/0247762 A1 Sep. 30, 2010

(30) Foreign Application Priority Data
Mar. 30, 2009 (JP) .................................. 2009-081521

(51) Int. Cl.
*B05D 5/00* (2006.01)
(52) U.S. Cl.
USPC ........... 427/264; 427/265; 427/377; 427/378; 427/373; 427/384; 427/407.1; 427/425; 427/424; 427/430.1
(58) Field of Classification Search
USPC .............. 427/230, 425, 348, 378, 377, 372.2, 427/384, 264–265, 373, 407.1, 424, 430.1
See application file for complete search history.

(56) References Cited

U.S. PATENT DOCUMENTS 1,995,767 A * 3/1935 Dean .............................. 427/177
3,176,412 A * 4/1965 Gardner .......................... 34/122
6,364,959 B1 * 4/2002 Straub et al. ....................... 134/9

FOREIGN PATENT DOCUMENTS

| JP | 2006-070254 | | 3/2006 |
| JP | 2007-175962 | | 7/2007 |
| WO | WO 2006014009 | A1 * | 2/2006 |
| WO | 2006/090579 | | 8/2006 |

OTHER PUBLICATIONS

Notification of Reasons for Refusal issued Mar. 27, 2013 by the Japanese Patent Office in corresponding Japanese Patent Application No. 2009-081521 with full English translation, 6 pages.

* cited by examiner

*Primary Examiner* — Michael Cleveland
*Assistant Examiner* — Alex A Rolland
(74) *Attorney, Agent, or Firm* — Young & Thompson

(57) ABSTRACT

In a coating zone, a cylindrical tube is soaked in and taken out from a solution, such that a coating film is formed on a curved surface of the tube. In a wet gas zone, while a first gas feeding nozzle having a gas outlet moves in a state where the gas outlet faces an outer peripheral surface of the tube, wet gas is blown toward the coating film through the gas outlet. Water drops are generated on the coating film and grown up. In a dry gas zone, as in the case of the first gas feeding nozzle, while a second gas feeding nozzle having a gas outlet moves, dry gas is blown toward the coating film through the gas outlet. Solvent and water drops are evaporated from the coating film. Pores form from the water drops as a template for the porous material on the coating film.

19 Claims, 14 Drawing Sheets

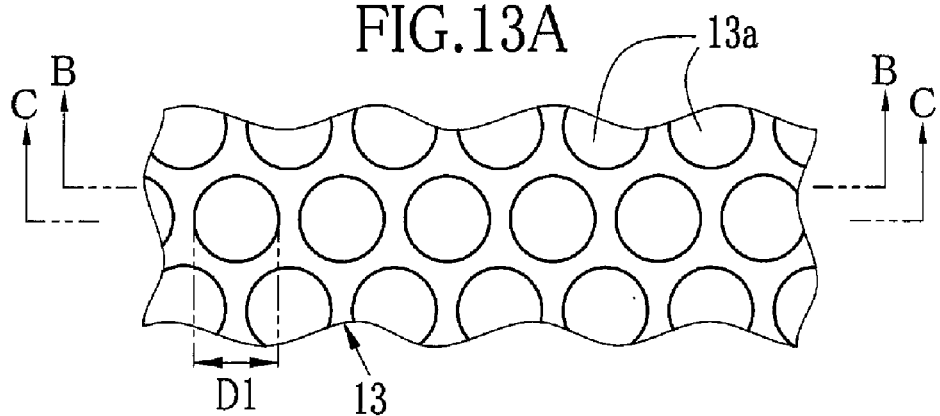
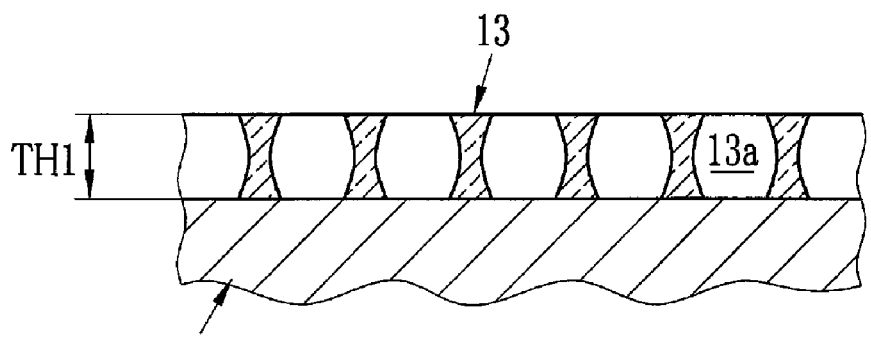
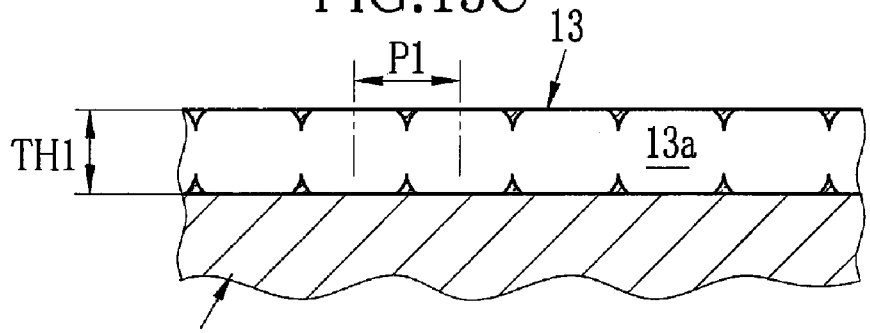
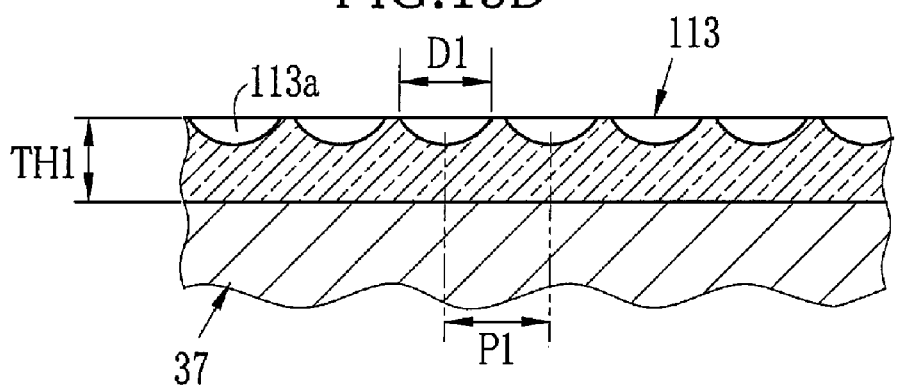

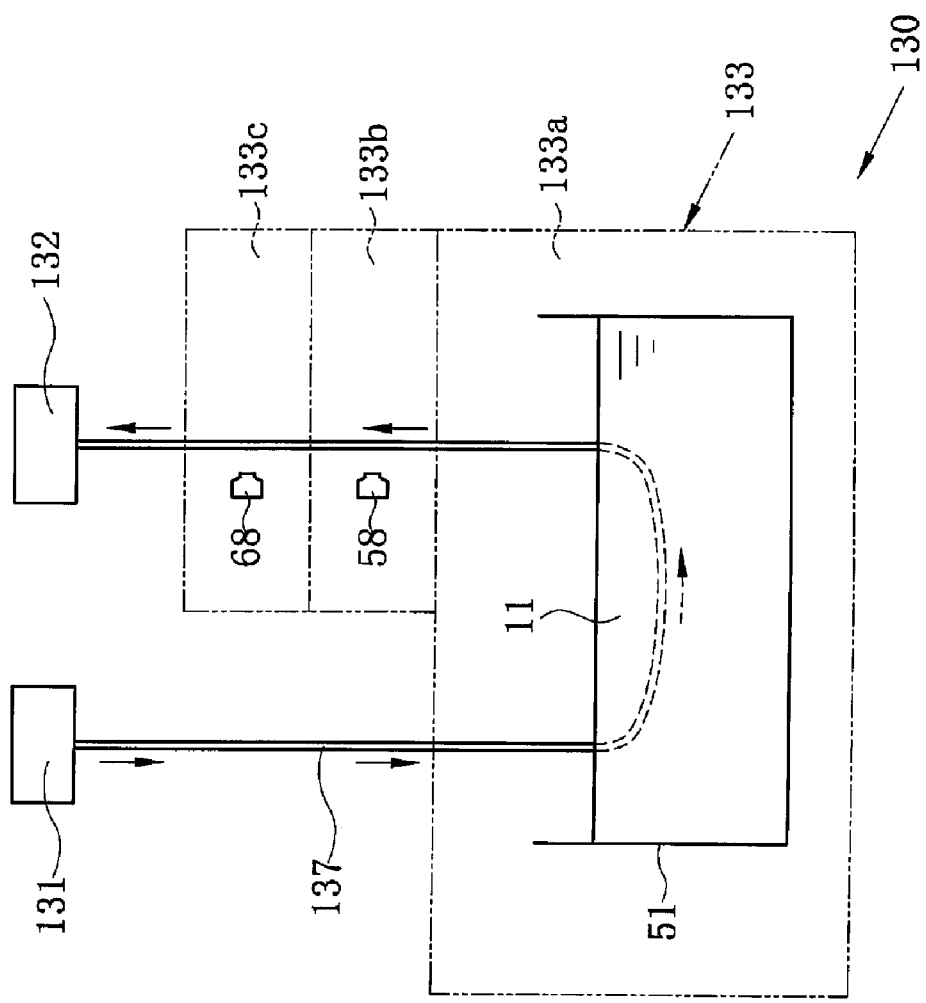

POROUS MATERIAL PRODUCTION METHOD

FIELD OF THE INVENTION

The present invention relates to a porous material production method, in which a plurality of water drops are generated on a coating film, and then the coating film is dried, such that pores are made by the water drops as a template for a porous material on the coating film.

BACKGROUND OF THE INVENTION

In recent years, increase in integration degree, higher information density, and higher image definition have been desired more and more in fields of optics and electronics. Therefore, a material used in these fields is strongly required to have a finer structure on its surface. Namely, forming a fine pattern structure (hereinafter referred to as fine patterning) has been strongly required. Additionally, in a field of research for a regenerative medicine, a film having a fine structure on its surface is effectively used as a scaffold for cell culture.

Various methods for the fine patterning have been put to practical use. For example, there are a deposition method using a mask, an optical lithography adopting photochemical reaction and polymerization reaction, a laser ablation technique, and the like. Additionally, according to Japanese Patent Laid-Open Publication No. 2006-070254, as the fine patterning, there is disclosed a method for forming a porous film having a plurality of pores from a solution.

The method for forming a porous film disclosed in Japanese Patent Laid-Open Publication No. 2006-070254 is briefly described hereinbelow. At first, a polymer solution containing a hydrophobic solvent and a polymer is applied to a support such that a coating film is formed on the support. The polymer solution is hereinafter referred to as solution. Next, wet gas is blown to an exposed surface of the coating film. The wet gas has temperature, dew point, condensation point of solvent vapor, and the like which are adjusted to be within a predetermined range. Water vapor is condensed from ambient air on the exposed surface to generate water drops. The water drops on the exposed surface are grown up. Note that, the water drops generated on the exposed surface enter an inside of the coating film while keeping its size or growing. At the end, dry gas is blown to the coating film to evaporate the solvent and the water drops from the coating film. In accordance with the evaporation of the water drops from the coating film, pores are made by the water drops as a template for the porous material on the coating film. Thus, the porous film having a plurality of pores can be formed from the solution.

The merit of the fine pattern structure obtained by the method disclosed in Japanese Patent Laid-Open Publication No. 2006-070254 lies in that it is possible to control the speed for cell culture more easily at lower cost by adjusting a pore diameter and a pitch of the pores in comparison with the fine pattern structure obtained by other kinds of fine patterning. If the fine pattern structure having the merit described above is disposed on a surface of a stent that is inserted into a blood vessel after a narrowed portion or an obstructed portion of the blood vessel is made open, it is possible to prevent restenosis of the blood vessel. Further, the fine pattern structure may be applied to not only the stent but also other medical devices to be disposed inside the human body, so as to achieve the advantageous effect as described above.

However, a surface of the stent or other medical devices such as catheter is generally not flat but curved. The fine patterning disclosed in Japanese Patent Laid-Open Publication No. 2006-070254 is limited to the fine patterning on a surface of a material in a sheet form. Therefore, the fine patterning disclosed in Japanese Patent Laid-Open Publication No. 2006-070254 is not suitable for a curved surface including the surface of the stent or other medical devices such as catheter.

SUMMARY OF THE INVENTION

In view of the above, an object of the present invention is to provide a porous material production method capable of achieving fine patterning on a curved surface.

In order to achieve the above and other objects, a porous material production method of the present invention includes a coating step, a water drop generating step, a water drop growing step, and a pore forming step. In the coating step, a solution containing a polymer and a hydrophobic solvent is applied to a curved surface of a support to form a coating film on the curved surface. In the water drop generating step, wet gas is blown toward the coating film through a first gas outlet provided in a first gas feeding nozzle such that water vapor is condensed from ambient air on the coating film to generate water drops on the coating film. In the water drop growing step, the water drops are grown up. In the pore forming step, the water drops are evaporated from the coating film to form pores in the coating film after the water drop growing step. Note that, the pores are made by the water drops as a template for a porous material.

Preferably, the wet gas is blown from the first gas feeding nozzle, while the first gas feeding nozzle is moved along the curved surface in a state where the first gas outlet faces the curved surface in at least one of the water drop generating step and the water drop growing step. Further, preferably, the support is caused to move in a state where the first gas outlet faces the curved surface of the support such that a portion of the curved surface to which the wet gas is blown changes in at least one of the water drop generating step and the water drop growing step. Furthermore, preferably, the first gas feeding nozzle and the support shift relative to each other in a state where the first gas outlet faces the curved surface of the support such that a portion of the curved surface to which the wet gas is blown changes in at least one of the water drop generating step and the water drop growing step.

Dry gas is preferably blown to the coating film in the pore forming step. Preferably, the dry gas is blown from a second gas feeding nozzle, while the second gas feeding nozzle is moved along the curved surface in a state where a second gas outlet provided in the second gas feeding nozzle faces the curved surface in the pore forming step. Further, preferably, the dry gas is blown from a second gas feeding nozzle, while the support is caused to move in a state where a second gas outlet provided in the second gas feeding nozzle faces the curved surface such that a portion of the curved surface to which the dry gas is blown changes in the pore forming step. Furthermore, preferably, the second gas feeding nozzle and the support shift relative to each other in a state where a second gas outlet provided in the second gas feeding nozzle faces the curved surface of the support such that a portion of the curved surface to which the dry gas is blown changes in the pore forming step.

It is preferable that the support is soaked in the solution, and then taken out from the solution in the coating step. Further, the water drop generating step is preferably started before 60 seconds elapse from the formation of the coating film.

According to the present invention, the solution containing the polymer and the hydrophobic solvent is applied to the curved surface of the support to form the coating film on the curved surface. Then, the wet gas is blown to the coating film such that water vapor is condensed from ambient air on the coating film to generate water drops thereon. Further, the dry gas is blown to the coating film such that the water drops after growing up are evaporated from the coating film. Therefore, it is possible to easily produce the porous material in which the pores each having a desired size are formed at a desired formation density on the curved surface.

DESCRIPTION OF THE DRAWINGS

One with ordinary skill in the art would easily understand the above-described objects and advantages of the present invention when the following detailed description is read with reference to the drawings attached hereto:

FIG. 13A is a plan view schematically illustrating a porous film having a plurality of through pores, FIG. 13B is a cross sectional view taken along chain double-dashed lines B-B of FIG. 13A, FIG. 13C is across sectional view taken along chain double-dashed lines C-C of FIG. 13A, and FIG. 13D is a plan view of a porous film having a plurality of dimples;

FIG. 16 is an explanatory view schematically illustrating a porous film production apparatus of a second embodiment.

DESCRIPTION OF THE PREFERRED EMBODIMENTS

Hereinafter, preferred embodiments of the present invention are described in detail. However, the present invention is not limited thereto.

(Porous Film Production Method)

Figure 1:
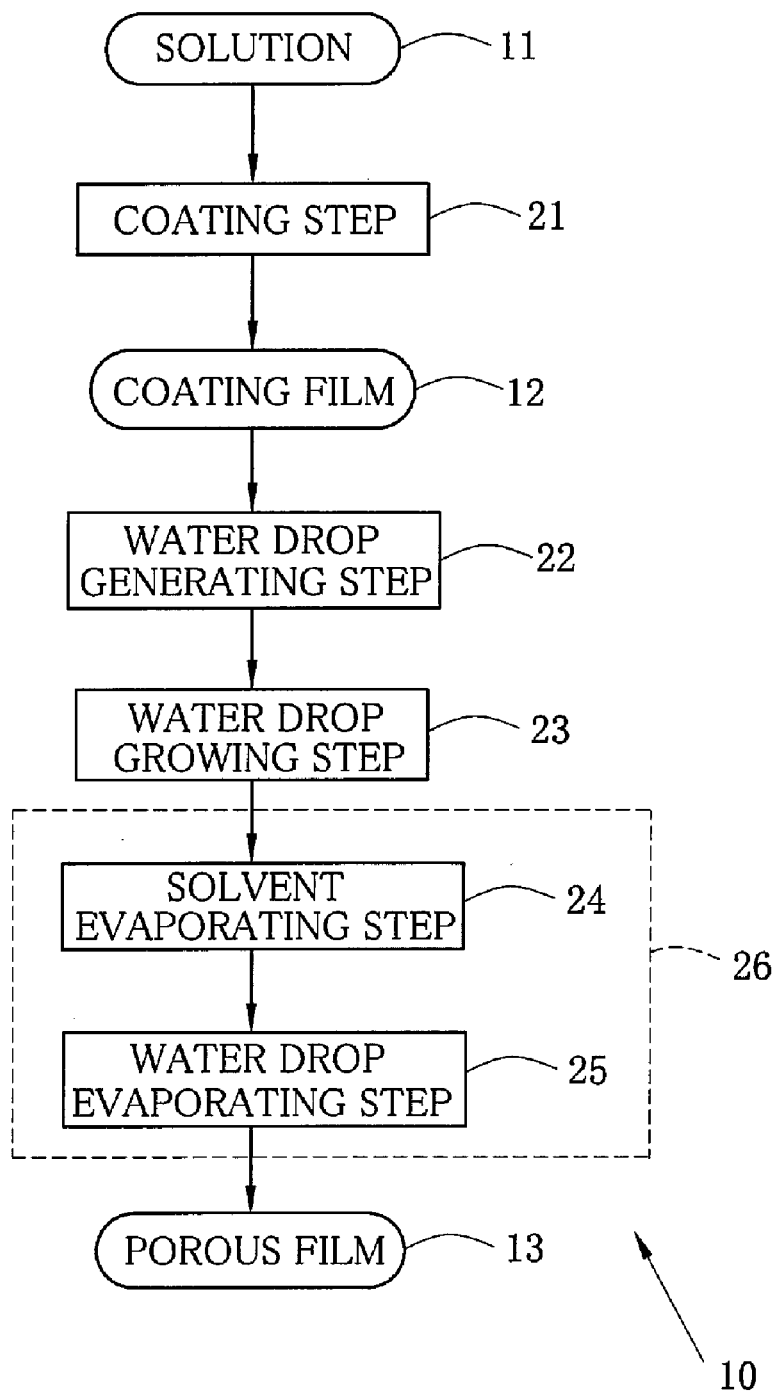
FIG. 1 is a flow chart schematically showing a porous film production process.

As shown in FIG. 1, in a porous film production process 10, a solution 11 becomes a coating film 12, and then the coating film 12 becomes a porous film 13 having a surface on which a plurality of pores are formed. The porous film production process 10 includes a coating step 21, a water drop generating step 22, a water drop growing step 23, a solvent evaporating step 24, and a water drop evaporating step 25. In the coating step 21, the solution 11 is applied to a support described later to form the coating film 12 on the support. Water drops are generated on a surface of the coating film 12 in the water drop generating step 22, and the water drops are grown up in the water drop growing step 23. In the solvent evaporating step 24, a solvent is evaporated from the coating film 12. In the water drop evaporating step 25, the water drops are evaporated from the coating film 12.

(Porous Film Production Apparatus)

Figure 2:
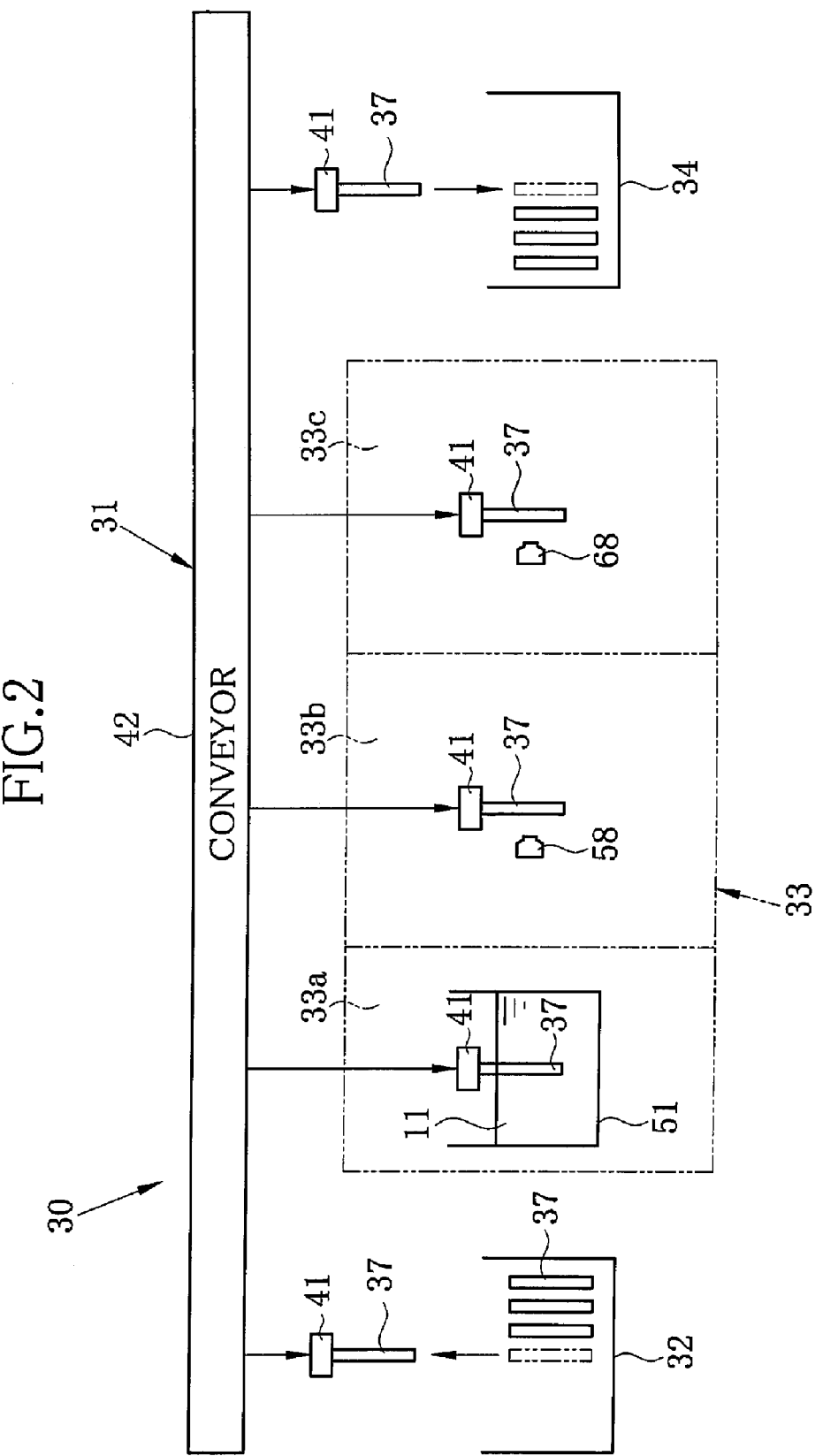
FIG. 2 is an explanatory view schematically illustrating a porous film production apparatus of a first embodiment.

As shown in FIG. 2, a porous film production apparatus 30 includes a handling device 31, a first container 32, a production chamber 33, and a second container 34. The first container 32 contains cylindrical tubes 37 each serving as the support. The production chamber 33 includes a coating zone 33a, a wet gas zone 33b, and a dry gas zone 33c. The tubes 37 are subjected to each step of the porous film production process 10 (see FIG. 1) while passing through each of the zones 33a to 33c. The second container 34 contains the tubes 37 subjected to the steps of the porous film production process 10 (see FIG. 1).

(Handling Device)

Figure 3:
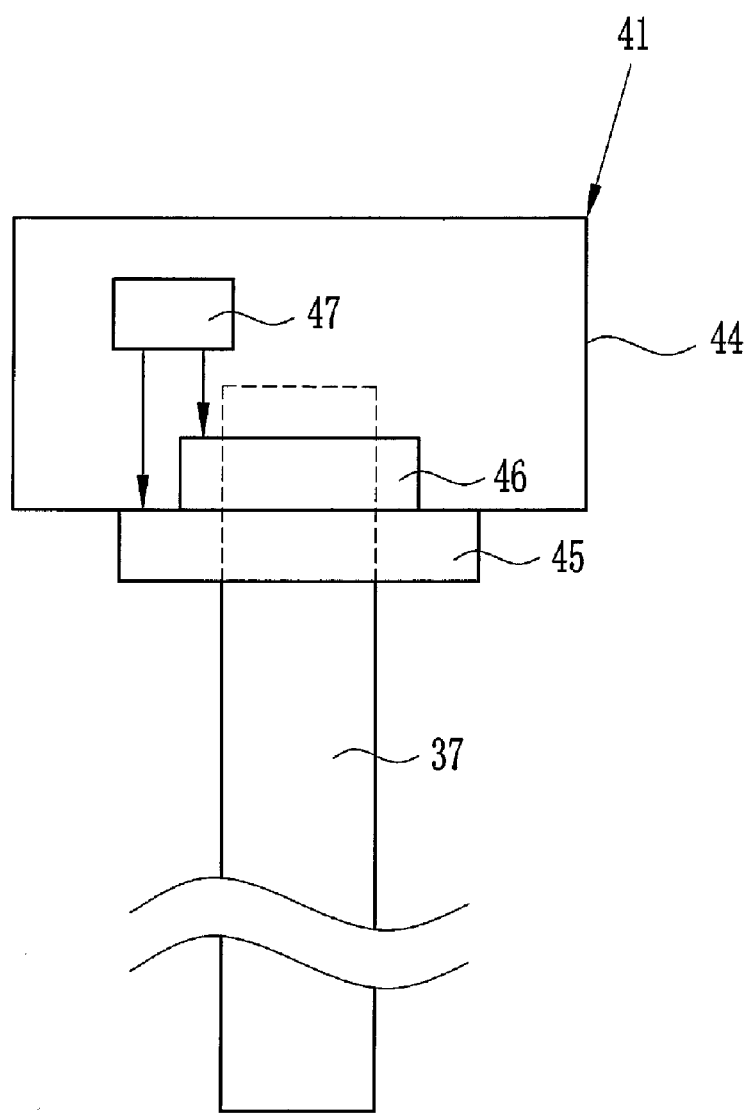
FIG. 3 is an explanatory view schematically illustrating a handling device.

As shown in FIG. 2, the handling device 31 has a holding plate 41 and a conveyor 42. As shown in FIG. 3, the holding plate 41 has a plate body 44, a clamp 45, a temperature adjuster 46, and a controller 47. The controller 47 controls such that the clamp 45 shifts between a holding state and a canceling state. In the holding state, the clamp 45 grasps a distal end of the tube 37. In the canceling state, the holding of the tube 37 by the clamp 45 is cancelled. Further, the controller 47 controls such that the temperature adjuster 46 adjusts the temperature of the tube 37 held by the clamp 45 within the range of 0 to 30° C.

In FIGS. 2 and 3, the conveyor 42 conveys the holding plate 41 such that the holding plate 41 passes through the first container 32, the coating zone 33a, the wet gas zone 33b, the dry gas zone 33c, and the second container 34 in this order. In the first container 32, the clamp 45 shifts from the canceling state to the holding state. In each of the zones 33a to 33c, the clamp 45 remains in the holding state. In the second container 34, the clamp 45 shifts from the holding state to the canceling state. In summary, in the handling device 31, the distal end of the tube 37 contained in the first container 32 is held, and then the tube 37 whose distal end is held is conveyed such that the tube 37 passes through the coating zone 33a, the wet gas zone 33b, the dry gas zone 33c, and the second container 34 in this order. Finally, the holding of the tube 37 is cancelled, and the tube 37 is put into the second container 34.

(Coating Zone)

As shown in FIG. 2, the coating zone 33a includes a storage tank 51 for storing the solution 11. A temperature controller (not shown) preferably keeps the temperature of the solution 11 stored in the storage tank 51 approximately constant within a predetermined range of 0 to 30° C.

(Wet Gas Zone)

Figure 4:
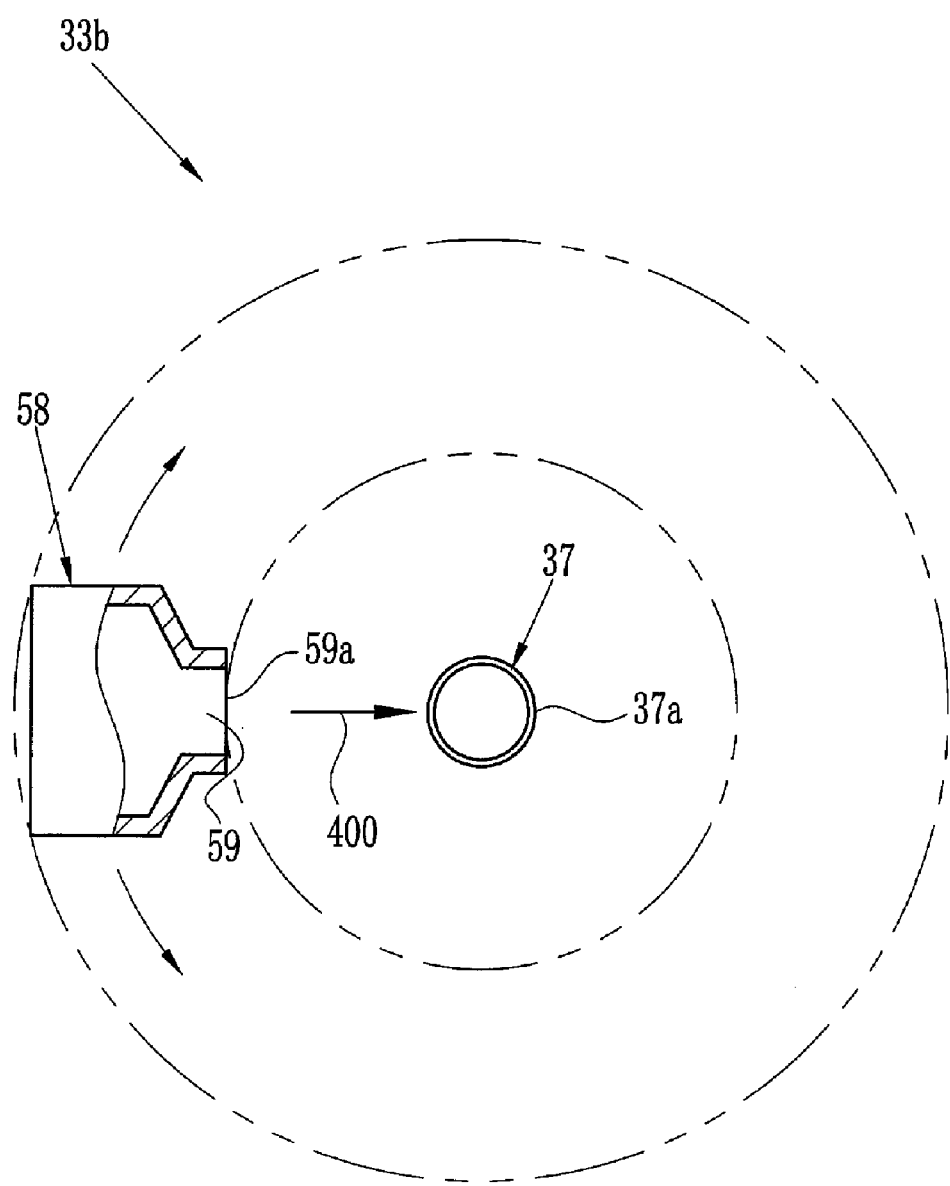
FIG. 4 is an explanatory view schematically illustrating a wet gas zone of a first embodiment.

In FIGS. 2 and 4, the tube 37 held by the holding plate 41 is disposed stationary at a predetermined position in the wet gas zone 33b. The wet gas zone 33b is provided with a gas feeding nozzle 58. The gas feeding nozzle 58 has a gas outlet 59 through which the wet gas 400 is blown out. The gas outlet 59 is formed so as to face an outer peripheral surface 37a of the tube 37. The gas feeding nozzle 58 is movable in the circumferential direction of the tube 37 disposed stationary.

The gas feeding nozzle 58 is connected to a wet gas feeder and a movement controller, which are not shown in the drawing. The movement controller controls such that the gas feeding nozzle 58 is moved in at least one of the circumferential direction, a radial direction, and an axial direction of the tube 37. Specifically, the movement controller controls such that the gas feeding nozzle 58 moves along the outer peripheral surface 37a in a state where the gas outlet 59 faces the outer peripheral surface 37a.

The wet gas feeder adjusts a temperature TA1 and a dew point TD1 of the wet gas 400, a condensation point TR1 of the solvent vapor contained in the wet gas 400, and the like within a predetermined range. Further, the wet gas feeder feeds the wet gas 400 whose temperature, humidity, and the like are adjusted to the gas feeding nozzle 58, such that the speed of the wet gas 400 blown through the gas outlet 59 toward the tube 37 is within a predetermined range.

(Dry Gas Zone)

Figure 5:
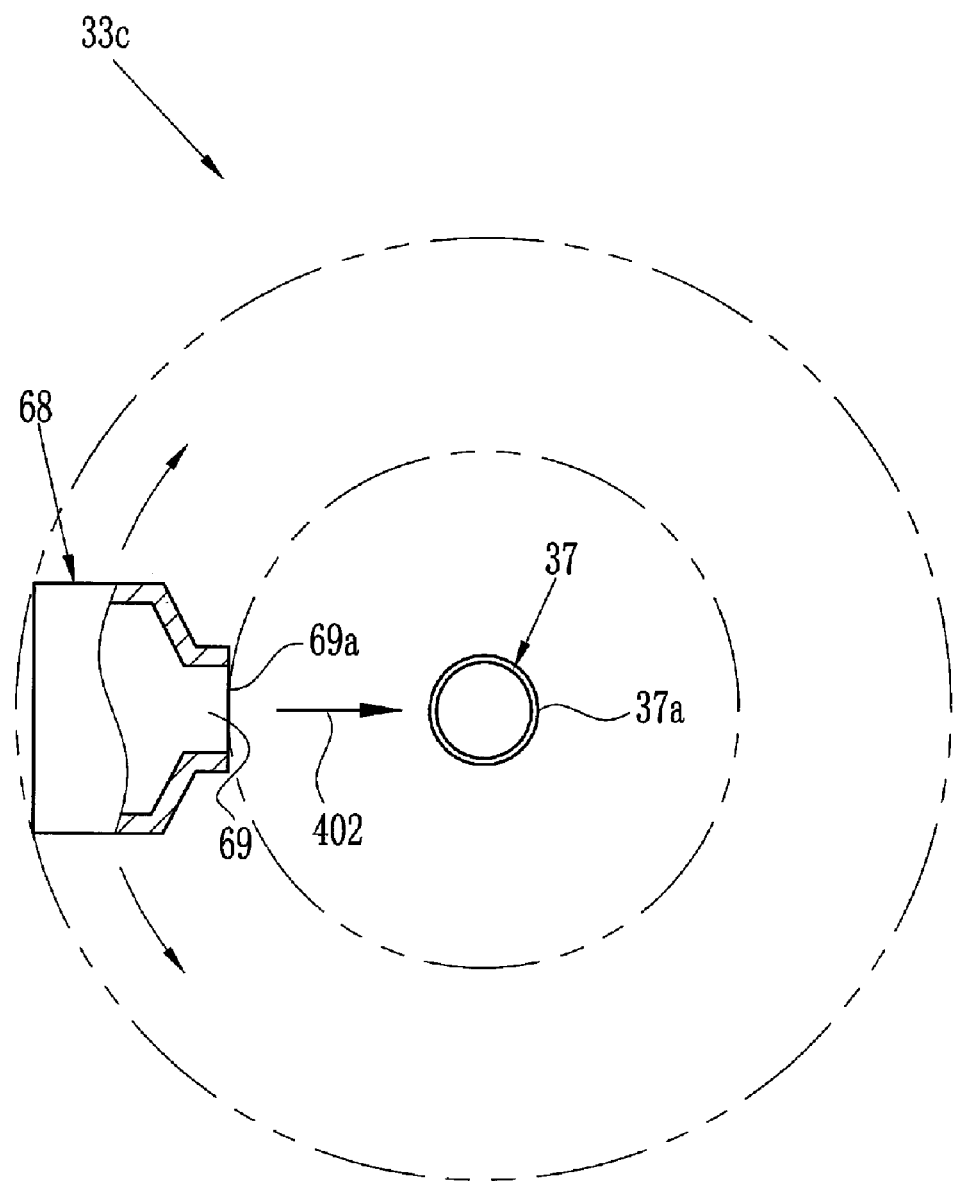
FIG. 5 is an explanatory view schematically illustrating a dry gas zone.

In FIGS. 2 and 5, as in the case of the wet gas zone 33b, the tube 37 held by the holding plate 41 is disposed stationary at a predetermined position in the dry gas zone 33c. The dry gas zone 33c is provided with a gas feeding nozzle 68. The gas feeding nozzle 68 has a gas outlet 69 through which the dry gas 402 is blown out. The gas outlet 69 is formed so as to face the outer peripheral surface 37a of the tube 37. The gas feeding nozzle 68 is movable in the circumferential direction of the tube 37 disposed stationary.

The gas feeding nozzle 68 is connected to a dry gas feeder and a movement controller, which are not shown in the drawing. The movement controller controls such that the gas feeding nozzle 68 is moved in at least one of the circumferential direction, the radial direction, and the axial direction of the tube 37. Specifically, the movement controller controls such that the gas feeding nozzle 68 moves along the outer peripheral surface 37a in a state where the gas outlet 69 faces the outer peripheral surface 37a.

The dry gas feeder adjusts a temperature TA2 and a dew point TD2 of the dry gas 402, a condensation point TR2 of the solvent vapor contained in the dry gas 402, and the like within a predetermined range. Further, the dry gas feeder feeds the dry gas 402 whose temperature, humidity, and the like are adjusted to the gas feeding nozzle 68, such that the speed of the dry gas 402 blown through the gas outlet 69 toward the tube 37 is within a predetermined range.

As the wet gas 400 and the dry gas 402, not only air but also nitrogen, rare gas, and other kinds of gas may be used.

Next, an operation of the present invention is described. As shown in FIG. 2, the tube 37 contained in the first container 32 is guided by the handling device 31 so as to pass through the coating zone 33a, the wet gas zone 33b, the dry gas zone 33c, and the second container 34 in this order.

Figure 6:
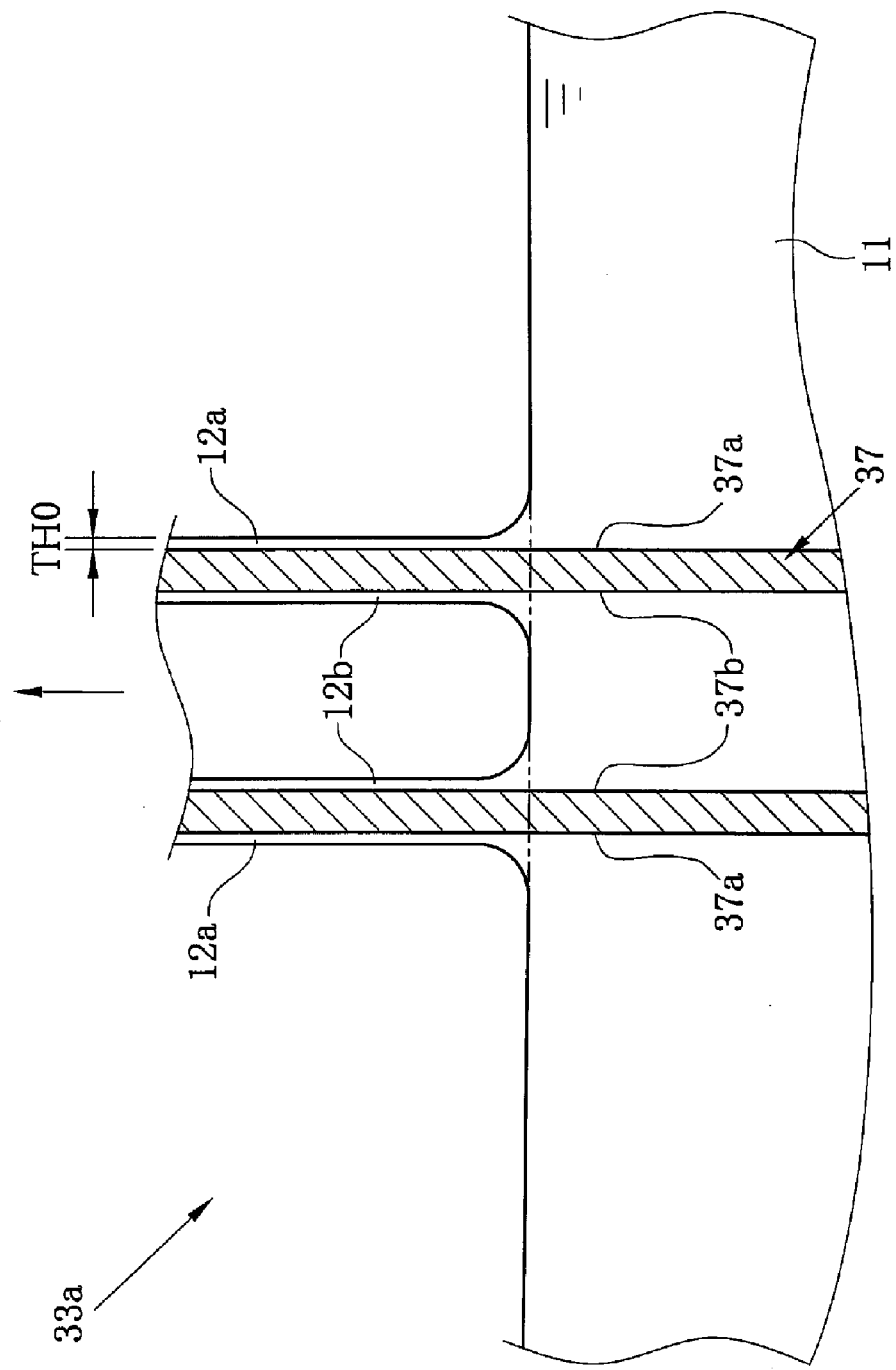
FIG. 6 is an explanatory view schematically illustrating a coating zone.

As shown in FIG. 2, the tube 37 is soaked in the solution 11 stored in the storage tank 51 in the coating zone 33a. Thereafter, when the tube 37 is taken out from the solution 11, as shown in FIG. 6, the solution 11 becomes a coating film 12a on the outer peripheral surface 37a of the tube 37, and a coating film 12b on an inner peripheral surface 37b of the tube 37. A thickness TH0 of each of the coating films 12a and 12b is preferably in the range of 1 μm to 300 μm.

Figure 7:
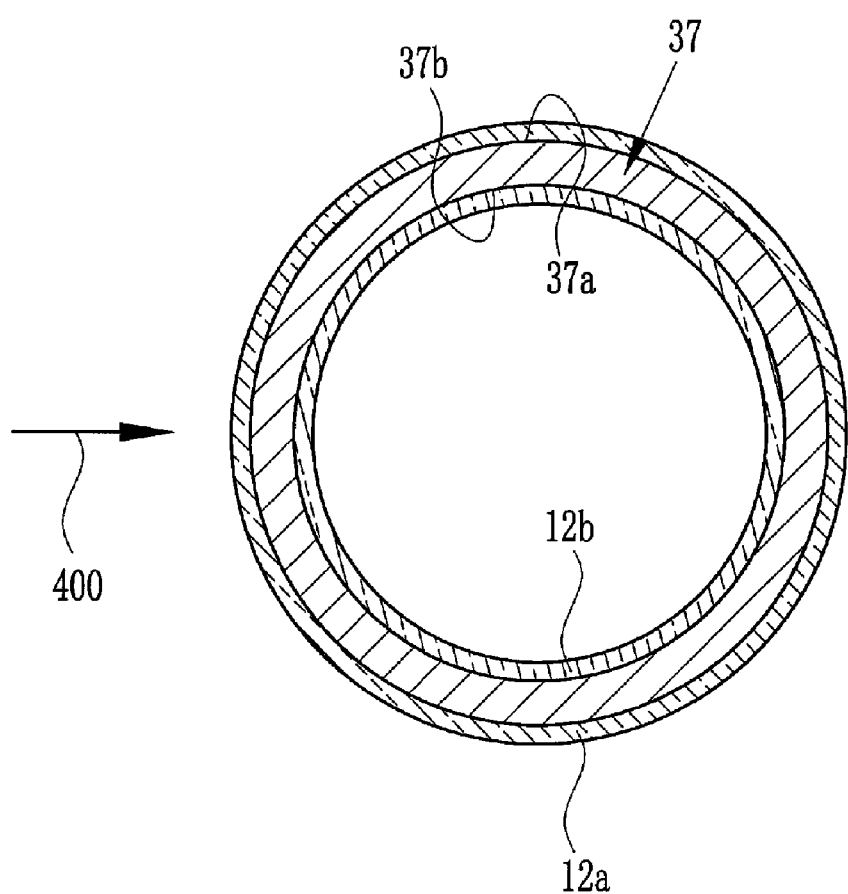
FIG. 7 is a cross sectional view of the wet gas zone of the first embodiment taken along a surface vertical to an axis direction of a tube.
Figure 8:
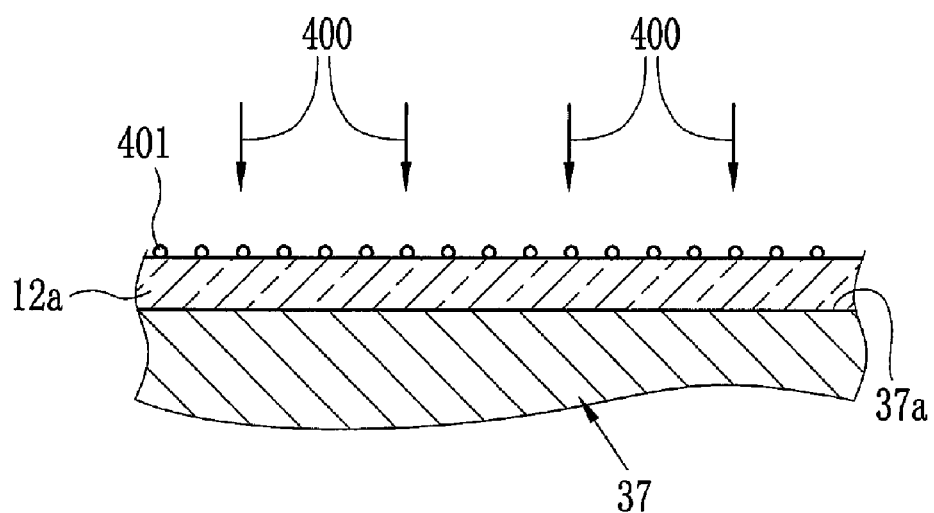
FIG. 8 is an explanatory view schematically illustrating a water drop generating step.

As shown in FIG. 2, the tube 37 is disposed stationary at a predetermined position in the wet gas zone 33b. In FIGS. 3 and 7, the temperature of the tube 37 is adjusted by the temperature adjuster 46 such that a temperature TS of an outer peripheral surface of the coating film 12a is within the range of 5° C. to 30° C. As shown in FIGS. 4 and 7, the gas feeding nozzle 58 rotates or oscillates in the circumferential direction of the tube 37 clockwise, counterclockwise, or both of clockwise and counterclockwise, in a state where the gas outlet 59 faces the outer peripheral surface 37a. A distance between the aperture plane 59a of the gas feeding nozzle 58 and the outer peripheral surface 37a is kept approximately constant while the gas feeding nozzle 58 moves in the circumferential direction of the tube 37. The distance between the aperture plane 59a and the outer peripheral surface 37a is preferably in the range of 3 mm to 300 mm. The wet gas feeder (not shown) controls such that the temperature TA1 and the dew point TD1 of the wet gas 400, the condensation point TR1 of the solvent vapor contained in the wet gas 400, and the like are adjusted so as to be suitable for the water drop generating step, and the wet gas 400 is fed to the gas feeding nozzle 58. While the gas feeding nozzle 58 moves along the outer peripheral surface 37a in a state where the gas outlet 59 faces the outer peripheral surface 37a, the wet gas 400 is blown through the gas outlet 59 of the gas feeding nozzle 58 toward the coating film 12a at a predetermined speed. The temperature TA1 of the wet gas 400 is preferably in the range of 5° C. to 40° C. The dew point TD1 of the wet gas 400 is preferably in the range of 5° C. to 30° C. As shown in FIG. 8, when the wet gas 400 contacts with the coating film 12a, water vapor is condensed from ambient air on the surface of the coating film 12a to generate water drops 401 thereon.

Figure 9:
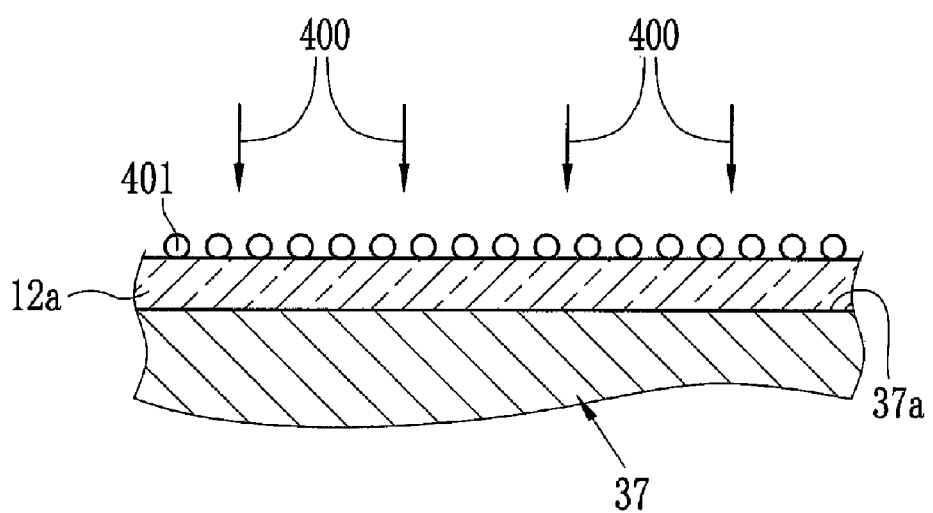
FIG. 9 is an explanatory view schematically illustrating a water drop growing step.

Next, the wet gas feeder (not shown) controls such that the temperature TA1 and the dew point TD1 of the wet gas 400, the condensation point TR1 of the solvent vapor contained in the wet gas 400, and the like are adjusted so as to be suitable for the water drop growing step, and the wet gas 400 is blown through the gas outlet 59 toward the coating film 12a at a predetermined speed. As shown in FIG. 9, when the wet gas 400 contacts with the coating film 12a, the water drops 401 generated on the surface of the coating film 12a are grown up. As described above, in the wet gas zone 33b (see FIG. 2), the water drop generating step and the water drop growing step are performed.

As shown in FIGS. 2 and 5, the tube 37 is disposed stationary at a predetermined position in the dry gas zone 33c by the conveyor 42. The gas feeding nozzle 68 rotates or oscillates in the circumferential direction of the tube 37 clockwise, counterclockwise, or both of clockwise and counterclockwise, in a state where the gas outlet 69 faces the outer peripheral surface 37a. A distance between the aperture plane 69a of the gas feeding nozzle 68 and the outer peripheral surface 37a is kept approximately constant while the gas feeding nozzle 68 moves in the circumferential direction of the tube 37. The distance between the aperture plane 69a and the outer peripheral surface 37a is preferably in the range of 3 mm to 300 mm.

Figure 10:
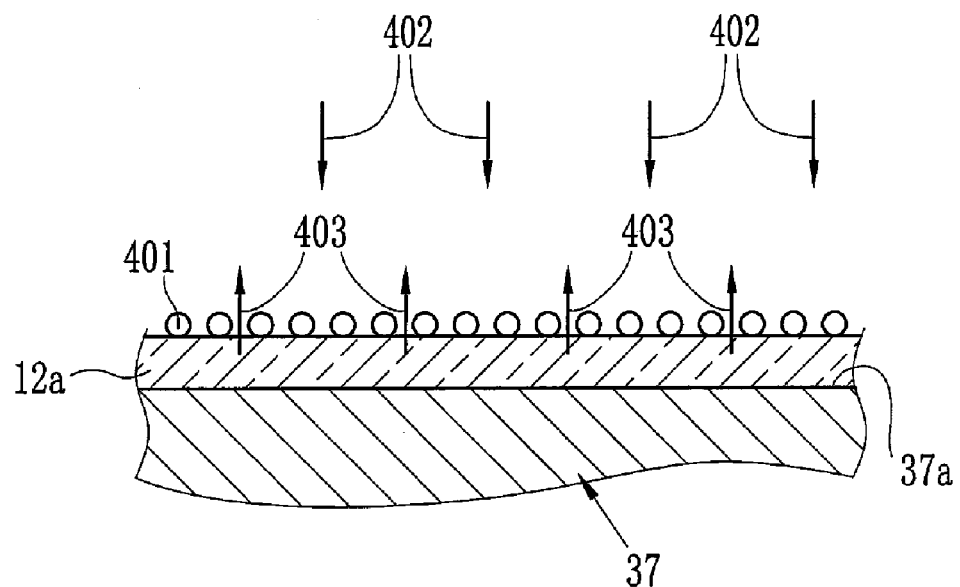
FIG. 10 is an explanatory view schematically illustrating a solvent evaporating step.

The dry gas feeder (not shown) controls such that a temperature TA2 and a dew point TD2 of the dry gas 402, a condensation point TR2 of the solvent vapor contained in the dry gas 402, and the like are adjusted so as to be suitable for the solvent evaporating step, and the dry gas 402 is fed to the gas feeding nozzle 68. While the gas feeding nozzle 68 moves along the outer peripheral surface 37a in a state where the gas outlet 69 faces the outer peripheral surface 37a, the dry gas 402 is blown through the gas outlet 69 of the gas feeding nozzle 68 toward the coating film 12a at a predetermined speed. As shown in FIG. 10, when the dry gas 402 contacts with the coating film 12a, a solvent 403 is evaporated from the coating film 12a. Thereby, the fluidity of solution for forming the coating film 12a is decreased. For the purpose of utilizing the water drops 401 as a template for the porous material, the solvent 403 is preferably evaporated from the coating film 12a until the fluidity of the solution for forming the coating film 12a is disappeared in the solvent evaporating step 24.

Figure 11:
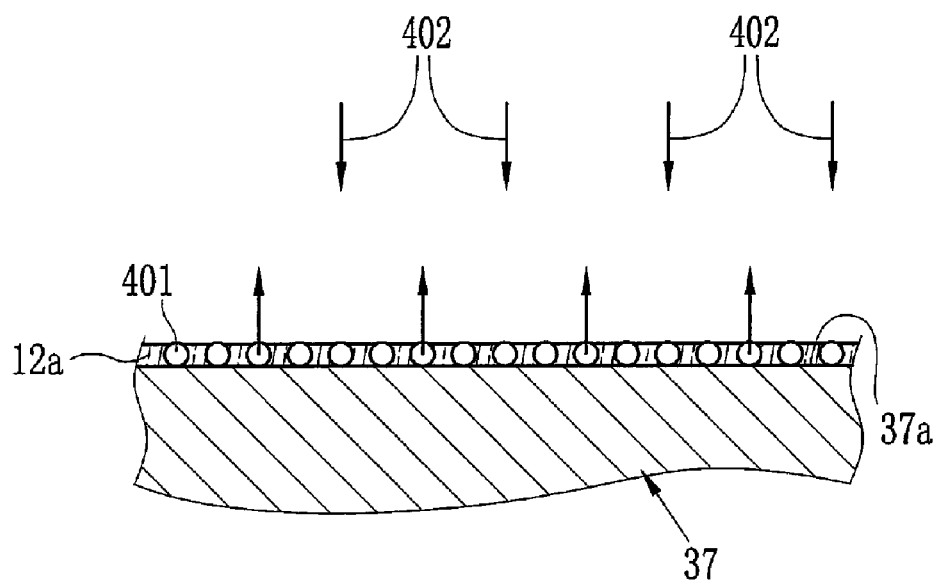
FIG. 11 is an explanatory view schematically illustrating a water drop evaporating step.

Next, the dry gas feeder (not shown) controls such that the temperature TA2 and the dew point TD2 of the dry gas 402, the condensation point TR2 of the solvent vapor contained in the dry gas 402, and the like are adjusted so as to be suitable for the water drop evaporating step, and the dry gas 402 is blown through the gas outlet 69 at a predetermined speed toward the surface of the coating film 12a formed on the outer peripheral surface 37a. As shown in FIG. 11, when the dry gas 402 contacts with the coating film 12a, the water drops 401 are evaporated from the coating film 12a. As described above, in the dry gas zone 33c (see FIG. 2), the solvent evaporating step 24 and the water drop evaporating step 25 are performed. Thus, pores are formed on the coating film 12a by utilizing the water drops 401 as a template for the porous material, and thereby the coating film 12a becomes the porous film 13 (see FIG. 1). Note that, the solvent evaporating step 24 and the water drop evaporating step 25 are collectively referred to as a pore forming step 26.

In FIG. 2, the porous film production process 10 (see FIG. 1) is performed in the production chamber 33. Finally, the tube 37 having the porous film 13 on its outer peripheral surface is sent to the second container 34 by the handling device 31.

(Porous Film)

In FIG. 13A, the porous film 13 in the form of cylinder has pores 13a on its outer peripheral surface. The pores 13a are densely arranged on the porous film 13 so as to form a so-called honeycomb structure. As shown in FIGS. 13B and 13C, the pores 13a are formed so as to penetrate the outer peripheral surface and the inner peripheral surface of the porous film 13. Note that, a porous film 113 having dimples 113a formed on its outer peripheral surface instead of the pores 13a as shown in FIG. 13D, and a porous film having dimples formed on its inner peripheral surface may be included in the present invention. Further, a porous film whose shape is not a cylinder may be also included in the present invention.

The size and formation density of the pores 13a and the dimples 113a vary in accordance with the formation conditions described later. According to the present invention, the configuration of the porous films 13 and 113 are not especially limited. However, the present invention is particularly effective, in a case where a thickness TH1 of the porous film 13 or 113 is at least 0.05 μm, a diameter D1 of the pores 13a of the porous film 13 or the dimples 113a of the porous film 113 is at least 0.05 μm, and a formation pitch P1 that is the distance between centers of the adjacent pores 13a or dimples 113a is in the range of 0.1 μm to 120 μm.

Note that, in this specification, the honeycomb structure means a structure in which the pores each having a specific shape and size are arranged regularly in a specific direction as described above. The regular arrangement of the pores is two dimensional in a case where the porous film is a single-layer film, and three dimensional in a case where the porous film is a multi-layer film. In the two dimensional arrangement of the pores, one pore is surrounded by plural (for example, 6) pores. In the three dimensional arrangement of the pores, the pores are formed most densely in a face-centered cubic structure or a hexagonal structure of a crystal structure in many cases. However, in some production conditions, the other arrangements are made. Note that the number of pores formed around one pore on the same plane is not limited to six, and may be three to five, or seven or more.

As described above, according to the present invention, the coating film 12a is formed on the outer peripheral surface 37a (see FIG. 6), namely on the curved surface of the support, and the predetermined wet gas 400 (see FIG. 4) and the dry gas 402 (see FIG. 5) are blown in this order toward the coating film 12a. Accordingly, it is possible to produce the porous film having the fine pattern structure on its curved surface.

As shown in FIG. 4, the aperture plane 59a is preferably formed to be approximately flat. However, the aperture plane 59a is not limited thereto. Wet gas 400 is blown through the gas outlet 59 provided in the aperture plane 59a toward the coating film 12a formed on the curved surface. Then, the timing at which the wet gas 400 contacts with the coating film 12a vary from area to area on the coating film 12a. As a result, it may be difficult to uniformly subject the coating film 12a to the water drop generating step and the water drop growing step. The same holds true for a case where the coating film 12a formed on the curved surface is subjected to the solvent evaporating step and the water drop evaporating step by utilizing the gas feeding nozzle 68 having the approximately flat aperture plane 69a.

In view of the above, according to the present invention, referring to FIGS. 4 and 7, the wet gas 400 is blown toward the coating film 12a through the gas outlet 59 of the gas feeding nozzle 58 moving at a predetermined speed in a state where the distance between the coating film 12a and the aperture plane 59a is kept constant in the wet gas zone 33b. Therefore, the water drops uniform in size can be generated in the water drop generating step, and the water drops can be grown up at the same speed on the coating film in the water drop growing step. In the similar manner, the dry gas 402 is blown toward the coating film 12a through the gas outlet 69 of the gas feeding nozzle 68 moving in a state where the distance between the surface of the coating film 12a and the aperture plane 69a is kept approximately constant in the dry gas zone 33c shown in FIG. 5. Therefore, in the solvent evaporating step and the water drop evaporating step, the solvent and the water drops can be evaporated from the coating film formed on the curved surface at the same speed. As described above, according to the present invention, it is possible to produce the porous film in which a plurality of pores uniform in size are formed while keeping the pitch thereof uniform.

(Water Drop Generating Step)

In FIG. 8, the formation amount of cores of the water drops 401 in the water drop generating step 22 can be controlled by adjusting a parameter ΔTw obtained by subtracting the temperature TS of the coating film 12a from the dew point TD1 of the wet gas 400. In order to condense water vapor from ambient air, the parameter ΔTw is set to at least 0° C. in the water drop generating step 22. Further, the lower limit of the parameter ΔTw is preferably at least 0.5° C., and more preferably at least 1° C. In contrast, when the parameter ΔTw is too high, the water drops 401 become nonuniform in size, and otherwise, the water drops 401, which should be arranged in two dimensional arrangement (in a matrix manner), are arranged in three dimensional arrangement in which one of the water drops 401 overlaps on the other one. As a result, the size and the pitch of the pores formed in the coating film become nonuniform. In view of the above, the upper limit of the parameter ΔTw is preferably at most 30° C., more preferably at most 25° C., and most preferably at most 20° C.

The relative speed V1 of the flow rate of wet gas 400 with respect to the moving speed of the coating film 12a is preferably within the range between 0.01 m/s or more and 10 m/s or less, and more preferably within the range between 0.05 m/s or more and 2 m/s or less. In a case where the relative speed V1 is less than 0.01 m/sec, water vapor is hardly condensed from ambient air on the coating film 12a, and the generation of the water drops as a template for the porous material is prevented, unfavorably. In contrast, in a case where the relative speed V1 exceeds 10 m/sec, an exposed surface of the coating film 12a loses smoothness, and thickness unevenness occurs unfavorably.

(Water Drop Growing Step)

In FIG. 9, the growth degree of cores of the water drops 401 in the water drop growing step can be controlled by adjusting the parameter ΔTw, as in the case of the water drop generating step. The parameter ΔTw is preferably at least 0° C. in the water drop generating step, such that the water drops 401 on the coating film 12a are grown up while preventing generation of new water drops. Further, the lower limit of the parameter ΔTw is preferably at least 0.5° C., and more preferably at least 1° C. In contrast, when the parameter ΔTw is too high, the water drops are grown up too much, and are fused with each other. As a result, there occurs trouble such as variation in pore diameters. In view of the above, the upper limit of the parameter ΔTw is preferably at most 30° C., more preferably at most 25° C., and most preferably at most 20° C.

The temperature TS of the coating film 12a is decreased due to latent heat of vaporization of the solvent contained in the coating film 12a, and as a result, the parameter ΔTw varies. Accordingly, it is unfavorable that the evaporation speed of the solvent is too fast in the water drop generating step and the water drop growing step. In view of the above, in a case where the evaporation speed of the solvent is too fast, it is preferable that the wet gas contains solvent vapor. However, in a case where the condensation point TR1 of the solvent vapor is higher than the surface temperature TS of the outer peripheral surface of the coating film 12a, the solvent vapor is condensed on the surface of the solution. Therefore, the condensation point TR1 of the solvent vapor is preferably lower than the surface temperature TS of the coating film 12a.

In FIG. 10, it is preferable that the evaporation, core formation, and core growth of the water drops 401 on the coating film 12a are prevented in the solvent evaporating step. The evaporation, core formation, and core growth of the water drops 401 on the coating film 12a can be prevented by adjusting the parameter ΔTw obtained by subtracting the surface temperature TS of the coating film 12a from the dew point TD2 of the dry gas 402. The parameter ΔTw is preferably in the range between 0° C. or more and 10° C. or less, and more preferably in the range between 0° C. or more and 5° C. or less. In FIG. 11, in the water drop evaporating step, in order to evaporate the solvent and the water drops 401 from the coating film 12a, the parameter ΔTw is preferably set to be as low as possible. In the solvent evaporating step and the water drop evaporating step, in order to evaporate the solvent from the coating film 12a, the condensation point TR2 of the solvent vapor contained in the dry gas 402 is preferably lower than the surface temperature TS of the coating film 12a. Further, the relative speed V2 of the flow rate of dry gas 402 with respect to the moving speed of the coating film 12a is preferably within the range between 0.01 m/s or more and 10 m/s or less, and more preferably within the range between 0.05 m/s or more and 2 m/s or less.

As shown in FIG. 6, the coating film 12a is formed on the outer peripheral surface 37a of the tube 37 taken out from the solution 11. The water drop generating step shown in FIG. 8 is preferably started before 60 seconds elapse from the formation of the coating film 12a, more preferably started before 30 seconds elapse from the formation of the coating film 12a, and most preferably started before 10 seconds elapse from the formation of the coating film 12a. In a case where the water drop generating step is not started even after 60 seconds elapse from the formation of the coating film 12a, the drying of the solution for forming the coating film 12a proceeds to increase the viscosity of the solution. As a result, the pores are not formed with utilizing the water drops as a template for the porous material in the coating film 12a, or otherwise the size and the pitch of the pores formed in the coating film 12a become nonuniform. Here, the start of the water drop generating step means the timing at which the wet gas adjusted for the water drop generating step contacts the coating film.

Figure 12:
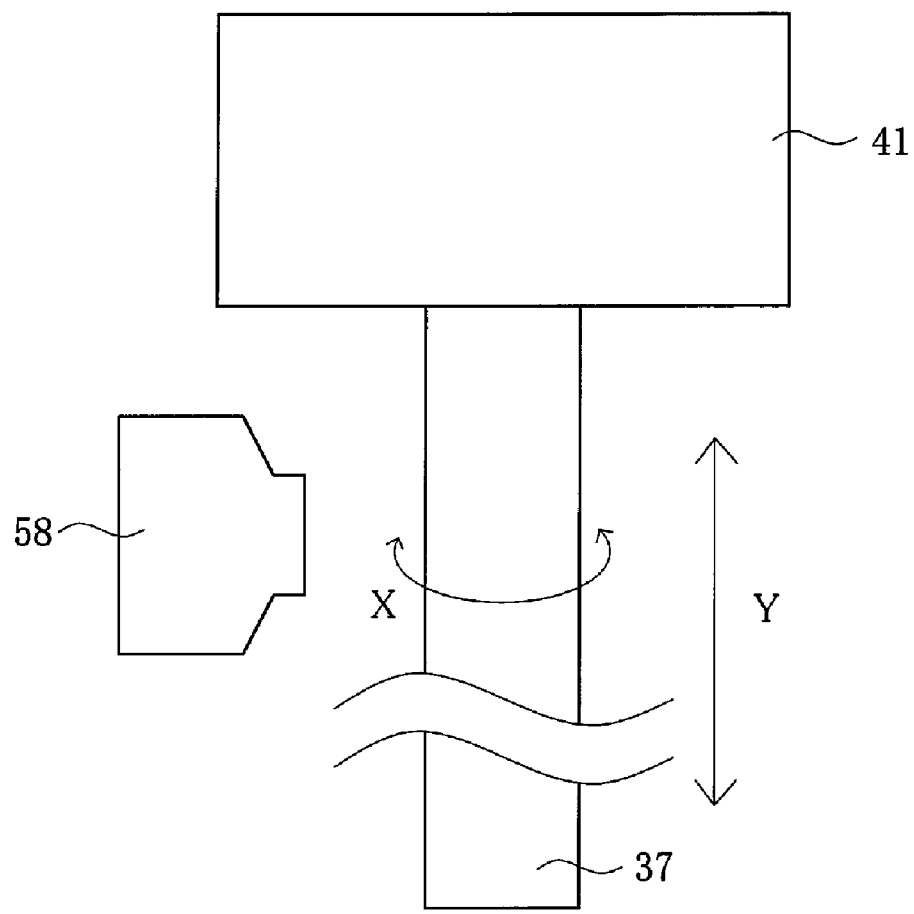
FIG. 12 is an explanatory view illustrating moving directions of a gas feeding nozzle.

Hereinafter, as shown in FIG. 12, a moving direction of the gas feeding nozzle 58 is referred to as X direction, and a direction perpendicular to the X direction is referred to as Y direction. In a case where the size of the coating film is larger than that of the gas outlet 59 in the Y direction, the gas feeding nozzle 58 which blows out the wet gas 400 is moved in the X direction, and then the gas feeding nozzle 58 which has stopped blowing the wet gas 400 is moved in the Y direction. Thereafter, again, the gas feeding nozzle 58 which blows out the wet gas 400 is moved in the X direction. The operation of the gas feeding nozzle 58 described above is repeated so as to make it possible to subject the entire coating film formed on the curved surface of the support to the water drop generating step and the water drop growing step. In a case where the support is a cylinder, the Y direction may be a longitudinal direction of the support, and the X direction may be the circumferential direction of the support. In a case where the support is the cylindrical tube 37, the X direction may be the circumferential direction of the tube 37, and the Y direction may be the axial direction of the tube 37. Further, it is also possible to move the gas feeding nozzle 58 in a spiral manner along the outer peripheral surface of the support. As in the case of the gas feeding nozzle 58, the gas feeding nozzle 68 which blows out the dry gas 402 is moved so as to make it possible to subject the entire coating film formed on the curved surface of the support to the solvent evaporating step and the water drop evaporating step.

Although one gas feeding nozzle 58 is used to perform both of the water drop generating step 22 and the water drop growing step 23, and one gas feeding nozzle 68 is used to perform both of the solvent evaporating step 24 and the water drop evaporating step 25 (see FIG. 1) in the above embodiment, the present invention is not limited thereto. A plurality of gas feeding nozzles 58 and 68 may be used to perform each of the steps 22 to 25. For example, a plurality of gas feeding nozzles 58 may be arranged in the X direction, the Y direction, or both of the X and Y directions, in a state where each of the gas outlets 59 faces the outer peripheral surface of the tube 37. A plurality of gas feeding nozzles 68 may be arranged in the same manner as in the case of the gas feeding nozzle 58. Among the plurality of gas feeding nozzles 58, some of them may be used as the gas feeding nozzles for blowing out the wet gas adjusted for the water drop generating step, and others of them may be used as the gas feeding nozzles for blowing out the wet gas adjusted for the water drop growing step. Similarly, among the plurality of gas feeding nozzles 68, some of them may be used as the gas feeding nozzles for blowing out the dry gas adjusted for the solvent evaporating step, and others of them may be used as the gas feeding nozzles for blowing out the dry gas adjusted for the water drop evaporating step.

Figure 14:
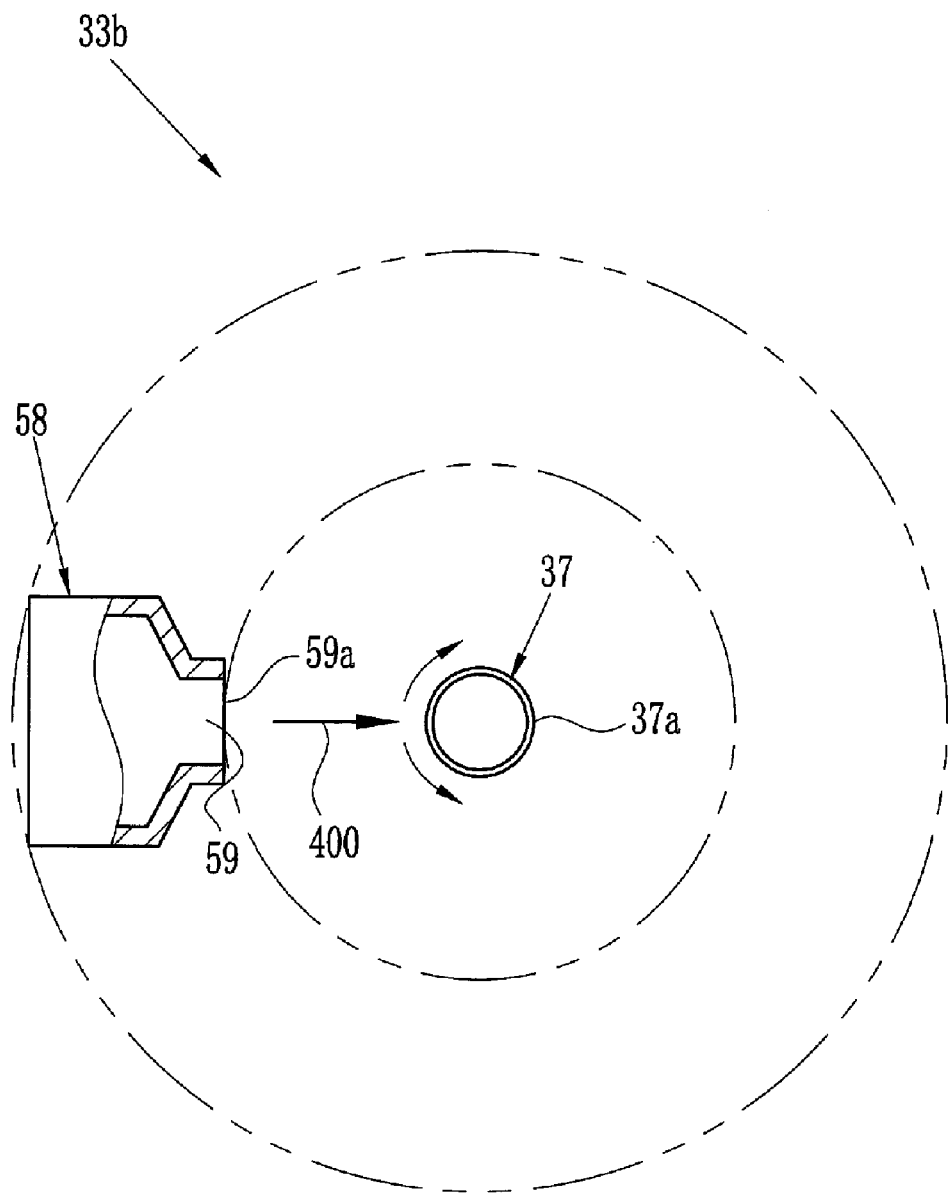
FIG. 14 is an explanatory view schematically illustrating a wet gas zone of a second embodiment.

Although the gas feeding nozzle 58 moving in the circumferential direction of the tube 37 disposed stationary is used in the wet gas zone 33b, and the gas feeding nozzle 68 moving in the circumferential direction of the tube 37 disposed stationary is used in the dry gas zone 33c in the above embodiment, the present invention is not limited thereto. For example, as shown in FIG. 14, the gas feeding nozzle 58 which blows out the wet gas 400 is disposed stationary near the outer peripheral surface 37a of the tube 37, and the tube 37 is caused to rotate or oscillate about its longitudinal axis clockwise, counterclockwise, or both of clockwise and counterclockwise, in a state where the outlet 59 faces the outer peripheral surface 37a of the tube 37. Accordingly, a portion of the outer peripheral surface 37a to which the wet gas 400 is blown changes at a constant speed. Thus, the amount of the wet gas 400 blown through the gas outlet 59, which contacts with the coating film 12a, is approximately uniform along the entire surface of the coating film 12a formed on the outer peripheral surface 37a. Accordingly, it is possible to uniformly subject the coating film formed on the curved surface to each of the water drop generating step 22 and the water drop growing step 23 (see FIG. 1). Additionally, the gas feeding nozzle 58 and the tube 37 may shift relative to each other in a state of where the gas outlet 59 faces the outer peripheral surface 37a of the tube 37. Note that the above description is not limited to the gas feeding nozzle 58, and may be applied to at least one of the gas feeding nozzle 58 and the gas feeding nozzle 68. Further, it is preferable that each of the steps 22 and 23 (see FIG. 1) is performed in a state where the distance between the aperture plane 59a and the outer peripheral surface 37a is kept constant.

Figure 15:
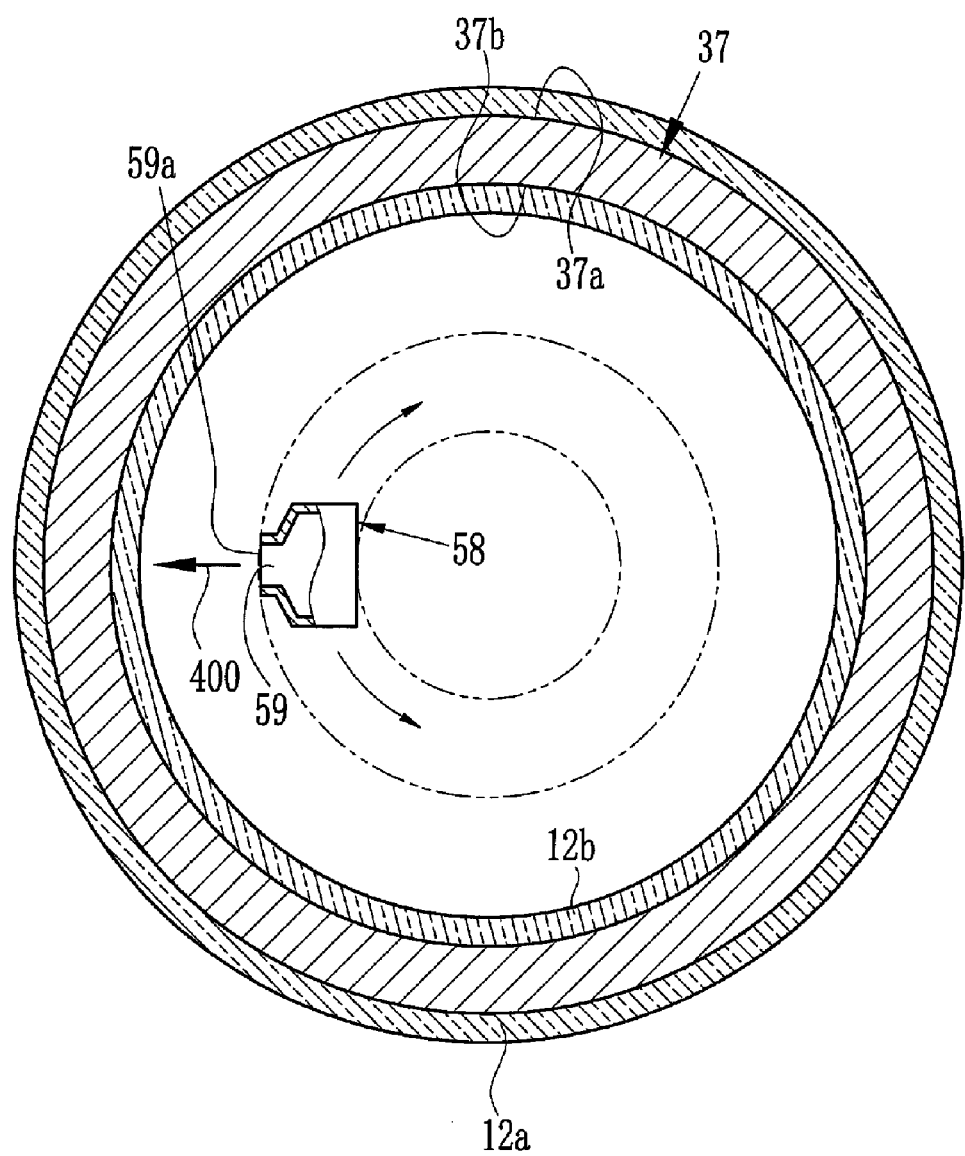
FIG. 15 is an explanatory view schematically illustrating a wet gas zone of a third embodiment.

Although the coating film 12a formed on the outer peripheral surface 37a of the tube 37 is subjected to each of the water drop generating step 22, the water drop growing step 23, the solvent evaporating step 24, and the water drop evaporating step 25 (see FIG. 1) as shown in FIGS. 4 and 7 in the above embodiment, the present invention is not limited thereto. It is also possible to subject the coating film 12b formed on the inner peripheral surface 37b of the tube 37 to each of the steps 22 to 25 (see FIG. 1). Explanation is made by referring to the water drop generating step 22 hereinbelow. As shown in FIG. 15, the gas feeding nozzle 58 is disposed in a cavity of the tube 37. The gas feeding nozzle 58 rotates or oscillates in the circumferential direction of the tube 37 clockwise, counterclockwise, or both of clockwise and counterclockwise, in a state where the gas outlet 59 faces the inner peripheral surface 37b. The distance between the aperture plane 59a of the gas feeding nozzle 58 for blowing out the wet gas 400 and the surface of the coating film 12b is kept approximately constant while the gas feeding nozzle 58 moves in the cavity of the tube 37. Further, instead of moving the gas feeding nozzle 58, the tube 37 may be caused to rotate or oscillate about its longitudinal axis clockwise, counterclockwise, or both of clockwise and counterclockwise. Additionally, the gas feeding nozzle 58 and the tube 37 may shift relative to each other in a state of where the gas outlet 59 faces the outer peripheral surface 37a of the tube 37. Furthermore, it is also possible to dispose the gas feeding nozzle 58 near the outer peripheral surface 37a and in the cavity of the tube 37, such that the coating film 12a formed on the outer peripheral surface 37a and the coating film 12b formed on the inner peripheral surface 37b are subjected to each of the steps 22 to 25 (see FIG. 1). Note that the above description is not limited to the gas feeding nozzle 58, and may be applied to at least one of the gas feeding nozzle 58 and the gas feeding nozzle 68.

Although the gas feeding nozzle 58 is disposed in the cavity of the tube 37 in the above embodiment, the present invention is not limited thereto. It is also possible to dispose the gas feeding nozzle 58 at the distal end of the tube 37 in its axial direction, such that the wet gas 400 blown from the gas feeding nozzle 58 passes through the cavity of the tube 37 in its axial direction. Further, it is possible to provide a gas feeding nozzle having the same structure as that of the gas feeding nozzle 58 at the holding plate 41.

Although the tube 37 disposed stationary in the vertical direction is subjected to each of the water drop generating step 22, the water drop growing step 23, the solvent evaporating step 24, and the water drop evaporating step 25 (see FIG. 1) as shown in FIG. 2 in the above embodiment, the present invention is not limited thereto. The tube 37 disposed stationary in the horizontal direction may be subjected to each of the steps 22 to 25 (see FIG. 1).

(Solvent Evaporation Preventing Step)

It is preferable that a step for preventing the solvent from being evaporated from the coating film 12 (hereinafter referred to as solvent evaporation preventing step) is performed between the coating step and the water drop generating step. For example, in the porous film production apparatus 30 shown in FIG. 2, a zone for performing the solvent evaporation preventing step (hereinafter referred to as solvent evaporation preventing zone) may be disposed in a conveying path of the tube 37 between the coating zone 33a and the wet gas zone 33b. The surface temperature TS of the coating film 12, a dew point TD3 of gas in the solvent evaporation preventing zone, and a condensation point TR3 of solvent vapor contained in the gas are preferably adjusted to be within a predetermined range. A parameter ΔTsolv obtained by subtracting the surface temperature TS of the coating film 12 from the condensation point TR3 is preferably within the range of −20° C. to 10° C. Further, it is preferred to prevent generation of the water drops on the coating film 12 in the solvent evaporation preventing zone. A parameter ΔTW obtained by subtracting the surface temperature TS of the coating film 12 from the dew point TD3 is preferably less than 0° C.

One wet gas zone 33b is disposed in the above embodiment, the present invention is not limited thereto. A plurality of wet gas zones 33b may be disposed. In a case where the plurality of wet gas zones 33b are disposed, it is possible to perform the water drop generating step in some of the wet gas zones 33b and perform the water drop growing step in others of the wet gas zones 33b.

One dry gas zone 33c is disposed in the above embodiment, the present invention is not limited thereto. A plurality of dry gas zones 33c may be disposed. In a case where the plurality of dry gas zones 33c are disposed, it is possible to perform the solvent evaporating step in some of the dry gas zones 33c and perform the water drop evaporating step in others of the dry gas zones 33c.

Although the dry gas feeder feeds the dry gas 402 to the gas feeding nozzle 68 once, and then the dry gas 402 is fed from the gas feeding nozzle 68 to the dry gas zone 33c in the above embodiment, the present invention is not limited thereto. The dry gas feeder may directly feed the dry gas 402 to the dry gas zone 33c. In this case, the gas feeding nozzle 68 may be omitted.

Although the wet gas zone for performing the water drop generating step 22 and the water drop growing step 23, and the dry gas zone for performing the solvent evaporating step 24 and the water drop evaporating step 25 are disposed in the above embodiment, the present invention is not limited thereto. It is also possible to perform the solvent evaporating step 24 and the water drop evaporating step 25 in the zone where the water drop generating step 22 and the water drop growing step 23 has been performed. In this case, switching between the wet gas feeding and the dry gas feeding may be performed in accordance with the steps, such that one of the wet gas and the dry gas is blown from the gas feeding nozzle disposed in the above zone.

Although each of the tubes 37 is subjected to the steps 21 to 25 (see FIG. 1) one by one to produce the porous film in the above embodiment, the present invention is not limited thereto. The steps 21 to 25 may be sequentially performed to produce the porous film as follows. For example, as shown in FIG. 16, a porous film production apparatus 130 includes an advancing device 131, a driving device 132, and a production chamber 133 disposed between the advancing device 131 and the driving device 132. The advancing device 131 contains a long tube 137. The tube 137 which is advanced from the advancing device 131 toward the driving device 132 passes through the production chamber 133 at a predetermined advancing speed.

The production chamber 133 includes a coating zone 133*a*, a wet gas zone 133*b*, and a dry gas zone 133*c* disposed in this order from an upstream side in an advancing direction of the tube 137. The coating zone 133*a* has the same structure as that of the coating zone 33*a*. The wet gas zone 133*b* has the same structure as that of the wet gas zone 33*b*. The dry gas zone 133*c* has the same structure as that of the dry gas zone 33*c*. The coating zone 133*a* is provided with the storage tank 51 for storing the solution 11. The wet gas zone 133*b* is provided with the gas feeding nozzle 58 for blowing out the wet gas 400 toward the tube 137. The dry gas zone 133*c* is provided with the gas feeding nozzle 68 for blowing out the dry gas 402 toward the tube 137. Note that between the coating zone 133*a* and the wet gas zone 133*b* may be provided the solvent evaporation preventing zone for performing the solvent evaporation preventing step.

(Support)

The material for forming the support is not especially limited. The preferable material for forming the support has sufficient chemical stability against the solvent to be used together, and heat resistance that is necessary during the porous film production process 10. As the preferable material for forming the support, there are, for example, organic materials such as polyethylene terephthalate (PET), polybutylene terephthalate (PBT), nylon 6, nylon 6,6, polypropylene, and polyimide, and inorganic materials such as glass, stainless, and other metals. A resin material subjected to a surface treatment for obtaining the chemical stability against the solvent also may be used as the preferable material for forming the support.

Note that the curved surface of the support, on which the coating film is to be formed, is preferably subjected to a treatment such that the curved surface of the support readily gets wet by the solution (hereinafter referred to as wetting treatment). The index of the wettability of the support against the solution may be, for example, a contact angle $\theta s$, a contact angle $\theta w$, and surface tension. The contact angle $\theta s$ is a contact angle of the solution to the curved surface. The contact angle $\theta w$ is a contact angle of the water to the curved surface. The contact angle $\theta s$ or $\theta w$ can be obtained by forming a liquid drop of the solvent or water on the curved surface and observing the shape of the liquid drop. The contact angle $\theta s$ is preferably in the range between 0° or more and 70° or less, and more preferably in the range between 0° or more and 5° or less. The contact angle $\theta w$ is preferably in the range between 5° or more and less than 180°, and more preferably in the range between 30° or more and less than 180°. A surface tension $\gamma$ of the solution 11 is preferably lower than a critical surface tension $\gamma c$ of the curved surface. Note that the surface tension $\gamma$ is preferably in the range between 5 mN/m or more and 50 mN/m or less, and more preferably in the range between 5 mN/m or more and 30 mN/m or less. The critical surface tension $\gamma c$ of the curved surface is preferably in the range between 20 mN/m or more and 200 mN/m or less, and more preferably in the range between 30 mN/m or more and 200 mN/m or less. The surface tension $\gamma$ of the solution 11 and the critical surface tension $\gamma c$ of the curved surface can be measured by a publicly-known measuring method such as a capillary rise method, a pendant drop method, and a ring method.

The wetting treatment may be applied to a whole of or a part of the curved surface of the support. For example, an area of the curved surface of the support which is subjected to the wetting treatment may be in a linear state, a lattice state, a stripe state, a plane state, or a sea-island state. Accordingly, the coating film can be formed on only a desired part of the curved surface of the support, and eventually, the porous material having a desired shape can be produced.

The coating zone 33*a* may be provided with a blade for scratching a part of the coating film. The depth of the coating film to be scratched by the blade may be equal to or smaller than the thickness of the coating film. Further, the blade may be provided at least one of near the outer peripheral surface 37*a* of the tube 37 and in the cavity of the tube 37.

Although the cylindrical tube 37 is used as the support having the curved surface in the above embodiment, the present invention is not limited thereto. According to the present invention, the support having the curved surface only has to have a spherical surface, an ellipsoidal surface, a pyramidal surface, a torus surface, or other curved surface. As the support having the curved surface, for example, there are a sphere, a spheroid, a cylinder, an elliptic cylinder, a circular cone, a circular truncated cone, a torus, a helicoid, a drum, and the like. Since a linear material is also considered as the cylinder or the elliptic cylinder, the linear material is considered as the support having the curved surface. Accordingly, a material formed by bending one or plural linear materials, and a material having a lattice formed by plural linear materials are also considered as the support having the curved surface of the present invention. The curved surface may be convex or concave. The lower limit of the radius of curvature of the curved surface is preferably at least 50 µm, and more preferably at least 100 µm, for example. The upper limit of the radius of curvature of the curved surface is preferably at most 1 m, and more preferably at most 50 cm.

Although the dip coating is used to form the coating film on the curved surface of the support in the above embodiment, the present invention is not limited thereto. Spray coating and other coating methods also may be used in the present invention.

The porous material of the present invention is not only the porous film but also the support having the porous film on its surface. In a case where a final product is the porous film only, the porous film may be separated from the support in a separation step. As the separation step, there are the following methods. The porous film may be peeled from the support. The support may be dissolved with use of the solvent. The porous film may be separated from the support by heating the support or applying ultraviolet ray to the support after forming the porous film on the surface of the support coated with a temperature-responsive polymer or UV-responsive polymer. The porous film may be separated from the support by swelling the porous film after soaking the support and the porous film in a swelling liquid. It is possible to obtain the porous film in the form of a cylinder by making a cut in the support only and then peeling the porous film from the support. It is possible to obtain the porous film in the form of a sheet by making a cut in the support and the porous film, peeling the porous film from the support, and expanding the porous film. In a case where the final product is the support having the porous film on it surface, it is possible to cut the support having the porous film on its surface into a predetermined size in a cutting step. Note that the cutting step is performed before or after the separation step.

(Raw Material)

As a raw material for the porous film is preferably a polymer capable of being dissolved into a water-insoluble solvent (hereinafter the polymer is referred to as hydrophobic polymer). Moreover, although only the hydrophobic polymer is sufficient to form the porous film, it is preferable that an amphiphilic polymer is used together with hydrophobic polymer.

(Solvent)

The solvent for preparing the solution 11 by dissolving the polymer is not especially limited as long as it has a hydrophobic character and can dissolve the polymer, and may be an organic solvent such as chloroform, dichloromethane, carbon tetrachloride, cyclohexane, methyl acetate, and the like.

The concentration of the polymer in the solution is sufficient as long as the coating film can be formed on the curved surface of the support to be taken out from the solution. For example, the concentration of the polymer in the solution is preferably in the range between 0.01 mass % or more and 30 mass % or less. When the concentration of the polymer in the solution is less than 0.01 mass %, the productivity of the porous film is low. Therefore, the polymer concentration of less than 0.01 mass % may be unsuitable for industrial mass production in some cases. In contrast, when the concentration of the polymer in the solution is more than 30 mass %, the viscosity of the solution is increased, and therefore it may be difficult to form the coating film by taking out the support from the solution.

(Hydrophobic Polymer)

The hydrophobic polymer is not especially limited, and may be appropriately selected among publicly known hydrophobic polymers in accordance with the purpose. Examples of the hydrophobic polymers are vinyl-type polymer (for example, polyethylene, polypropylene, polystyrene, polyacrylate, polymethacrylate, polyacrylamide, polymethacrylamide, polyvinyl chloride, polyvinylidene chloride, polyvinylidene fluoride, polyhexafluoropropene, polyvinyl ether, polyvinyl carbazol, polyvinyl acetate, polytetrafluoroethylene, and the like), polyesters (for example, polyethylene terephthalate, polyethylene naphthalate, polyethylene succinate, polybutylene succinate, polylactic acid, and the like), polylactone (for example, polycaprolactone and the like), polyamide or polyimide (for example, nylon, polyamic acid, and the like), polyurethane, polyurea, polybutadiene, polycarbonate, polyaromatics, polysulfone, polyethersulfone, polysiloxane derivative, cellulose acylate (for example, triacetyl cellulose, cellulose acetate propionate, cellulose acetate butyrate, and the like), and the like. These may be used in the form of homo polymer, and otherwise used as copolymer or polymer blend as necessary, in view of solubility, optical physical properties, electric physical properties, film strength, elasticity, and the like. Note that these polymers may be used in the form of mixture containing two or more kinds of polymers as necessary. The polymers for optical purpose are preferably cellulose acylate, cyclic polyolefin, and the like, for example.

The amphiphilic polymer is not especially limited, and appropriately selected in accordance with the purpose. For example, there are an amphiphilic polymer which has a main chain of polyacrylamide, a hydrophobic side chain of dodecyl group, and a hydrophilic side chain of carboxyl group, a block copolymer of polyethylene glycol/polypropylene glycol, and the like.

The hydrophobic side chain is a group which has nonpolar normal (linear) chain such as alkylene group, phenylene group, and the like, and preferably has a structure in which a hydrophilic group such as polar group or ionic dissociative group is not divided until the end of the chain, except a linking group such as ester group and amide group. The hydrophobic side chain preferably has at least five methylene units if it is composed of alkylene group. The hydrophilic side chain preferably has a structure having a hydrophilic part such as polar group, ionic dissociative group, or oxyethylene group on the end through a linking part such as alkylene group.

The ratio of the hydrophobic side chain to the hydrophilic side chain varies depending on the size of the side chain, the intensity of polarity, the strength of hydrophobicity of the hydrophobic organic solvent, or the like, and cannot be specified in general. However, the unit ratio (hydrophilic group: hydrophobic group) is preferably in the range of 0.1:9.9 to 4.5:5.5. Further, in a case of the copolymer, a block copolymer in which blocks of the hydrophobic side chain and blocks of the hydrophilic side chain do not affect the solubility thereof in the hydrophobic solvent is preferably used, rather than an alternating polymer of a hydrophobic side chain and a hydrophilic side chain.

The number average molecular weight (Mn) of the hydrophobic polymer and the amphiphilic polymer is preferably in the range of 1,000 to 10,000,000, and more preferably in the range of 5,000 to 1,000,000.

The composition ratio (mass ratio) of the hydrophobic polymer to the amphiphilic polymer is preferably in a range of 99:1 to 50:50, and more preferably in range of 98:2 to 70:30. In a case where the ratio of the amphiphilic polymer is less than 1 mass %, it is impossible in some cases to obtain a porous film in which the pores uniform in size are formed while keeping the pitch thereof uniform. In contrast, in a case where the ratio of the amphiphilic polymer is more than 50 mass %, stability of the coating film, in particular, mechanical stability thereof cannot be obtained sufficiently in some cases.

It is also preferable that the hydrophobic polymer and the amphiphilic polymer to be used as the material of the porous material are a polymerizable (crosslinkable) polymer having a polymerizable group in its molecule. Further, preferably, a polymerizable polyfunctional monomer is blended together with the hydrophobic polymer and/or the amphiphilic polymer, and after forming a honeycomb film by the blending, the honeycomb film is cured by a publicly known method such as a thermal curing method, a UV curing method, or an electron beam curing method.

As the polyfunctional monomer that can be used together with the hydrophobic polymer and/or the amphiphilic polymer, polyfunctional (meth)acrylate is preferable from the viewpoint of reactivity. As the polyfunctional (meth)acrylate, for example, there can be used dipentaerythritol pentaacrylate, dipentaerythritol hexaacrylate, dipentaerythritol caprolactone adduct hexaacrylate or a modified compound thereof, an epoxy acrylate oligomer, a polyester acrylate oligomer, a urethane acrylate oligomer, N-vinyl-2-pyrrolidone, tripropylene glycol diacrylate, polyethylene glycol diacrylate, trimethylolpropane triacrylate, pentaerythritol triacrylate, pentaerythritol tetraacrylate or a modified compound thereof, and the like. These polyfunctional monomers are used alone or in combination of two or more types thereof from the viewpoint of the balance between resistance to abrasion and flexibility.

In a case where the hydrophobic polymer and the amphiphilic polymer are a polymerizable (crosslinkable) polymer having a polymerizable group in its molecule, it is also preferred to use a polymerizable polyfunctional monomer that can react with the polymerizable group of the hydrophobic polymer and the amphiphilic polymer.

The monomer having an ethylene type unsaturated group can be polymerized by irradiation of ionizing radiation or heating under the presence of a photoradical initiator or a thermal radical initiator. Accordingly, a coating liquid containing the monomer having the ethylene type unsaturated group, the photoradical initiator or the thermal radical initiator, matting particles, and inorganic filler is prepared, and then the coating liquid is applied to a transparent base material and cured by polymerization reaction caused by the ionizing radiation or heating. Thereby, a porous film capable of being used as an antireflection film can be produced.

As the photoradical initiator, there are acetophenones, benzoins, benzophenones, phosphine oxides, ketals, anthraquinones, thioxanthones, azo compounds, peroxides, 2,3-alkyl dion compounds, disulfide compounds, fluoroamine compounds, and aromatic sulfoniums, for example.

As the acetophenones, there are 2,2-ethoxyacetophenone, p-methylacetophenone, 1-hydroxydimethyl phenyl ketone, phenyl ketone, 2-methyl-4-methylthio-2-morpholinopropiophenone, 2-benzyl-2-dimethylamino-1-(4-morpholinophenyl)-butanone, and the like, for example.

As the benzoins, there are benzoin benzenesulfonic ester, benzoin toluenesulfonic ester, benzoin methyl ether, benzoin ethyl ether, benzoin isopropyl ether, and the like, for example.

As the benzophenones, there are benzophenone, 2,4-chlorobenzophenone, 4,4-dichlorobenzophenone, p-chlorobenzophenone, and the like, for example.

As the phosphine oxides, there are 2,4,6-trimethylbenzoyl diphenylphosphine oxide and the like, for example.

Various examples of the photoradical initiator are described in "Saishin UV-Koka Gijutsu (Latest UV Curing Technologies)" (page 159, publisher: Kazuhiro TAKABO, publishing company: Technical Information Institute CO., LTD, 1991). As a preferable example of a commercially available photocleavage-type photoradical initiator, there is Irgacure (651,184,907) produced by Chiba Specialty Chemicals CO., Ltd (Ciba Japan K.K.).

The photoradical initiator is preferably used within a range of 0.1 to 15 parts by mass, and more preferably within a range of 1 to 10 parts by mass, relative to 100 parts by mass of the polyfunctional monomer.

Note that a photosensitizer may be used in addition to the photoradical initiator. As the example of the photosensitizer, there are n-butylamine, triethylamine, tri-n-butylphosphine, Michler's ketone, thioxanthone, and the like.

As the thermal radical initiator, organic peroxide, inorganic peroxide, organic azo compound, organic diazo compound, and the like can be used, for example.

As the organic peroxide, there are benzoyl peroxide, halogen benzoyl peroxide, lauroyl peroxide, acetyl peroxide, dibutyl peroxide, cumene hydroperoxide, butyl hydroperoxide, and the like, for example. As the inorganic peroxide, there are hydrogen peroxide, ammonium persulfate, potassium persulfate, and the like, for example. As the azo compound, there are 2,2'-azobis (isobutyronitrile), 2,2'-azobis (propionitrile), 1,1'-azobis (cyclohexanecarbonitrile), and the like, for example. As the diazo compound, there are diazoaminobenzene, p-nitrobenzenediazonium, and the like, for example.

EXAMPLE

Experiment 1

The porous film was produced on the outer peripheral surface of the tube 37 in the porous film production apparatus 30 shown in FIG. 2. In the coating zone 33a, the coating film was formed on the peripheral surface of the tube 37. In the wet gas zone 33b, the wet gas adjusted under a predetermined condition was blown to the coating film in the water drop generating step. The water drop generating step started after 5 seconds of the formation of the coating film. Thereafter, the wet gas adjusted under a predetermined condition was further blown to coating film for 120 seconds in the water drop growing step. Then, in the dry gas zone 33c, the dry gas adjusted under a predetermined condition was blown to the coating film in the solvent evaporating step. Thereafter, the dry gas adjusted under a predetermined condition was further blown to the coating film in the water drop evaporating step. Additionally, between the coating zone 33a and the wet gas zone 33b, the coating film was subjected to the solvent evaporation preventing step. In the wet gas zone 33b, the gas feeding nozzle 58 for feeding the wet gas was moved in the circumferential direction of the tube 37, such that the gas feeding nozzle 58 rotated about the axis of the tube 37. In the dry gas zone 33c, the gas feeding nozzle 68 for feeding the dry gas was moved in the circumferential direction of the tube 37, such that the gas feeding nozzle 68 rotated about the axis of the tube 37.

Experiment 2

A porous film was produced in the same manner as Experiment 1 except that movement of each of the gas feeding nozzles 58 and 68 was not performed.

Experiment 3

A porous film was produced in the same manner as Experiment 1 except that the water drop generating step started after 60 seconds of the formation of the coating film, and thereafter the wet gas adjusted under a predetermined condition was blown to coating film for 300 seconds in the water drop growing step.

Experiment 4

A porous film was produced in the same manner as Experiment 3 except that the water drop generating step started after 70 seconds of the formation of the coating film, and the solvent evaporation preventing step was omitted.

Experiment 5

A porous film was produced in the same manner as Experiment 1 except the following. The water drop generating step started after 120 seconds of the formation of the coating film, and thereafter the wet gas adjusted under a predetermined condition was blown to coating film for 600 seconds in the water drop growing step. The movement of each of the gas feeding nozzles 58 and 68 was not performed. The solvent evaporation preventing step was omitted.

(Evaluation)

The pore diameters of the porous film obtained in each of the experiments 1 to 5 were measured, and a pore diameter variation coefficient X (unit: %) was calculated. The pore diameter variation coefficient X was determined as $\{(\text{standard deviation of pore diameter})/(\text{average pore diameter})\} \times 100$. The pore diameter variation coefficient X was evaluated based on the following criteria.

E (Excellent): Pore diameter variation coefficient X was 5% or less.

G (Good): Pore diameter variation coefficient X was in a range between more than 5% and 10% or less.

P (Passed): Pore diameter variation coefficient X was more than 10%.

The table 1 shows time A required from the formation of the coating film to the start of the water drop generating step, time B for which the wet gas was blown to the coating film in the water drop growing step, the pore diameter variation coefficient X, and the evaluation result of each of the experiments 1 to 5.

TABLE 1

| | A [sec] | B [sec] | Whether or not solvent evaporation preventing step was done | Whether or not rotational movement of gas feeding nozzles was done | X [%] | Evaluation result |
|---|---|---|---|---|---|---|
| EX 1 | 5 | 120 | Done | Done | 3.5 | E |
| EX 2 | 5 | 120 | Done | Not done | 8.5 | G |
| EX 3 | 60 | 300 | Done | Done | 7.2 | G |
| EX 4 | 70 | 300 | Not done | Done | 12 | P |
| EX 5 | 120 | 600 | Not done | Not done | 15 | P |

Based on the experiments 1 to 5, it was found that, a porous film having pores uniform in size can be easily produced on the curved surface according to the present invention.

Various changes and modifications are possible in the present invention and may be understood to be within the present invention.

What is claimed is:

1. A porous material production method comprising the steps of:
   (A) applying a solution containing a polymer and a hydrophobic solvent to a curved surface of a support to form a coating film on said curved surface, said support being a cylindrical tube;
   (B) blowing wet gas toward said coating film through a first gas outlet provided in a first gas feeding nozzle such that water vapor is condensed from ambient air on said coating film to generate water drops on said coating film;
   (C) growing said water drops; and
   (D) evaporating said water drops from said coating film to form pores in said coating film after the step C, said pores being made by said water drops as a template for a porous material.

2. A porous material production method as defined in claim 1, wherein said wet gas is blown from said first gas feeding nozzle, while said first gas feeding nozzle is moved along said curved surface in a circumferential direction in a state where said first gas outlet faces said curved surface in at least one of the step B and the step C.

3. A porous material production method as defined in claim 1, wherein said support is caused to move in a state where said first gas outlet faces said curved surface of said support such that a portion of said curved surface to which said wet gas is blown changes in at least one of the step B and the step C.

4. A porous material production method as defined in claim 1, wherein said first gas feeding nozzle and said support shift relative to each other in a state where said first gas outlet faces said curved surface of said support such that a portion of said curved surface to which said wet gas is blown changes in at least one of the step B and the step C.

5. A porous material production method as defined in claim 1, wherein dry gas is blown to said coating film in the step D.

6. A porous material production method as defined in claim 5, wherein said dry gas is blown from a second gas feeding nozzle, while said second gas feeding nozzle is moved along said curved surface in a circumferential direction in a state where a second gas outlet provided in said second gas feeding nozzle faces said curved surface in the step D.

7. A porous material production method as defined in claim 5, wherein said dry gas is blown from a second gas feeding nozzle, while said support is caused to move in a state where a second gas outlet provided in said second gas feeding nozzle faces said curved surface such that a portion of said curved surface to which said dry gas is blown changes in the step D.

8. A porous material production method as defined in claim 5, wherein said second gas feeding nozzle and said support shift relative to each other in a state where a second gas outlet provided in said second gas feeding nozzle faces said curved surface of said support such that a portion of said curved surface to which said dry gas is blown changes in the step D.

9. A porous material production method as defined in claim 1, wherein said support is soaked in said solution, and then taken out from said solution in the step A.

10. A porous material production method as defined in claim 1, wherein the step B is started before 60 seconds elapse from the formation of said coating film.

11. A porous material production method comprising:
   (A) at a first location, a coating step of applying a solution containing a polymer and a hydrophobic solvent to a curved side cylindrical surface of a tube to form a coating film on said curved surface by soaking one end, including the curved side cylindrical surface, of the tube into the solution;
   (B) at a second location, a water drop generating step of blowing a wet gas toward said coating film through a first gas outlet provided in a first gas feeding nozzle such that water vapor is condensed from ambient air on said coating film to generate water drops on a surface of said coating film, wherein the first gas outlet faces an outer peripheral surface of the tube;
   (C) a water drop growing step of using the wet gas, at a controlled temperature, for growing said water drops on the surface of said coating film; and
   (D) a water drop evaporating step of evaporating said water drops from said coating film to form pores in said coating film after the step C, said pores being made by said water drops forming a template for a porous material.

12. A porous material production method as defined in claim 11, wherein said wet gas is blown from said first gas feeding nozzle, while said first gas feeding nozzle is moved along said curved surface in a circumferential direction in a state where said first gas outlet faces said curved surface in the step B.

13. A porous material production method as defined in claim 11, wherein said wet gas is blown from said first gas feeding nozzle, while said first gas feeding nozzle is moved along said curved surface in a circumferential direction in a state where said first gas outlet faces said curved surface in the step C.

14. A porous material production method as defined in claim 11, wherein at the first location, the coating step of applying the solution to the curved side cylindrical surface of the tube includes soaking the one end of the tube into the solution within a tank so that both interior and exterior curved side cylindrical surface of the tube are coated.

15. A porous material production method as defined in claim 11, wherein dry gas is blown to said coating film in the step D to evaporate said water drops from said coating film to form the pores in said coating film.

16. A porous material production method as defined in claim 15, wherein said dry gas is blown from a second gas feeding nozzle, while said second gas feeding nozzle is moved along said curved surface in a circumferential direction in a state where a second gas outlet provided in said second gas feeding nozzle faces said curved surface in the step D.

17. A porous material production method as defined in claim 15, wherein said dry gas is blown from a second gas feeding nozzle, while said support is caused to move in a state where a second gas outlet provided in said second gas feeding nozzle faces said curved surface such that a portion of said curved surface to which said dry gas is blown changes in the step D.

18. A porous material production method as defined in claim 15, wherein said second gas feeding nozzle and said support shift relative to each other in a state where a second gas outlet provided in said second gas feeding nozzle faces said curved surface of said support such that a portion of said curved surface to which said dry gas is blown changes in the step D.

19. A porous material production method as defined in claim 11, wherein said step (D) includes a solvent evaporating sub-step, using a dry gas, of evaporating a solvent from said coating film.

* * * * *